US008821286B2

(12) United States Patent
Gagner et al.

(10) Patent No.: US 8,821,286 B2
(45) Date of Patent: Sep. 2, 2014

(54) WAGERING GAME SYSTEM HAVING MOTION SENSING CONTROLLERS

(71) Applicant: WMS Gaming, Inc., Waukegan, IL (US)

(72) Inventors: Mark B. Gagner, West Chicago, IL (US); Sean P. Kelly, Chicago, IL (US); Timothy C. Loose, Chicago, IL (US); Scott A. Massing, Lincolnwood, IL (US); Nickey C. Shin, Chicago, IL (US); Jesse M. Smith, Chicago, IL (US); Martin R. Ugarte, Jr., Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 145 days.

(21) Appl. No.: 13/630,689

(22) Filed: Sep. 28, 2012

(65) Prior Publication Data

US 2013/0084984 A1 Apr. 4, 2013

Related U.S. Application Data

(60) Provisional application No. 61/540,662, filed on Sep. 29, 2011.

(51) Int. Cl.
*G07F 17/32* (2006.01)
*A63F 13/06* (2006.01)

(52) U.S. Cl.
CPC ........ *G07F 17/3206* (2013.01); *G07F 17/3209* (2013.01); *A63F 13/06* (2013.01)
USPC ........................................................... 463/39

(58) Field of Classification Search
CPC .. G07F 17/3206; G07F 17/3209; A63F 13/06
USPC ........................................................... 463/39
See application file for complete search history.

(56) References Cited

U.S. PATENT DOCUMENTS

2007/0259716 A1 11/2007 Mattice et al.
2007/0259717 A1 11/2007 Mattice et al.
2008/0076505 A1 3/2008 Nguyen et al.
2008/0268931 A1* 10/2008 Alderucci et al. .............. 463/11
2008/0300055 A1* 12/2008 Lutnick et al. .................. 463/39
2010/0087241 A1 4/2010 Nguyen et al.
2011/0118013 A1 5/2011 Mattice et al.

* cited by examiner

*Primary Examiner* — Corbett B Coburn
(74) *Attorney, Agent, or Firm* — DeLizio Gilliam, PLLC

(57) ABSTRACT

A method includes receiving, by a motion sensing controller, two calibration wireless transmissions that were transmitted from two different wireless emitters that are fixedly positioned to two different components of a wagering game system during calibration. The method includes receiving, by the motion sensing controller, two gameplay wireless transmissions that was transmitted from the two different wireless emitters for tracking of the wagering game play of the wagering game. The method includes determining a calibration movement difference between the two calibration wireless transmissions and determining a gameplay movement difference between the two gameplay wireless transmissions. In response to the calibration movement difference and the gameplay movement difference being unequal, outputting an indicator of at least one of a component movement and distortion of one of the two different gameplay transmissions.

25 Claims, 15 Drawing Sheets

WAGERING GAME SYSTEM HAVING MOTION SENSING CONTROLLERS

RELATED APPLICATIONS

This application claims the priority benefit of U.S. Provisional Application Ser. No. 61/540,662 filed Sep. 29, 2011.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

FIELD

Embodiments of the inventive subject matter relate generally to wagering game systems, and more particularly to wagering game systems including motion sensing controllers integrated into wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

Figure 1:
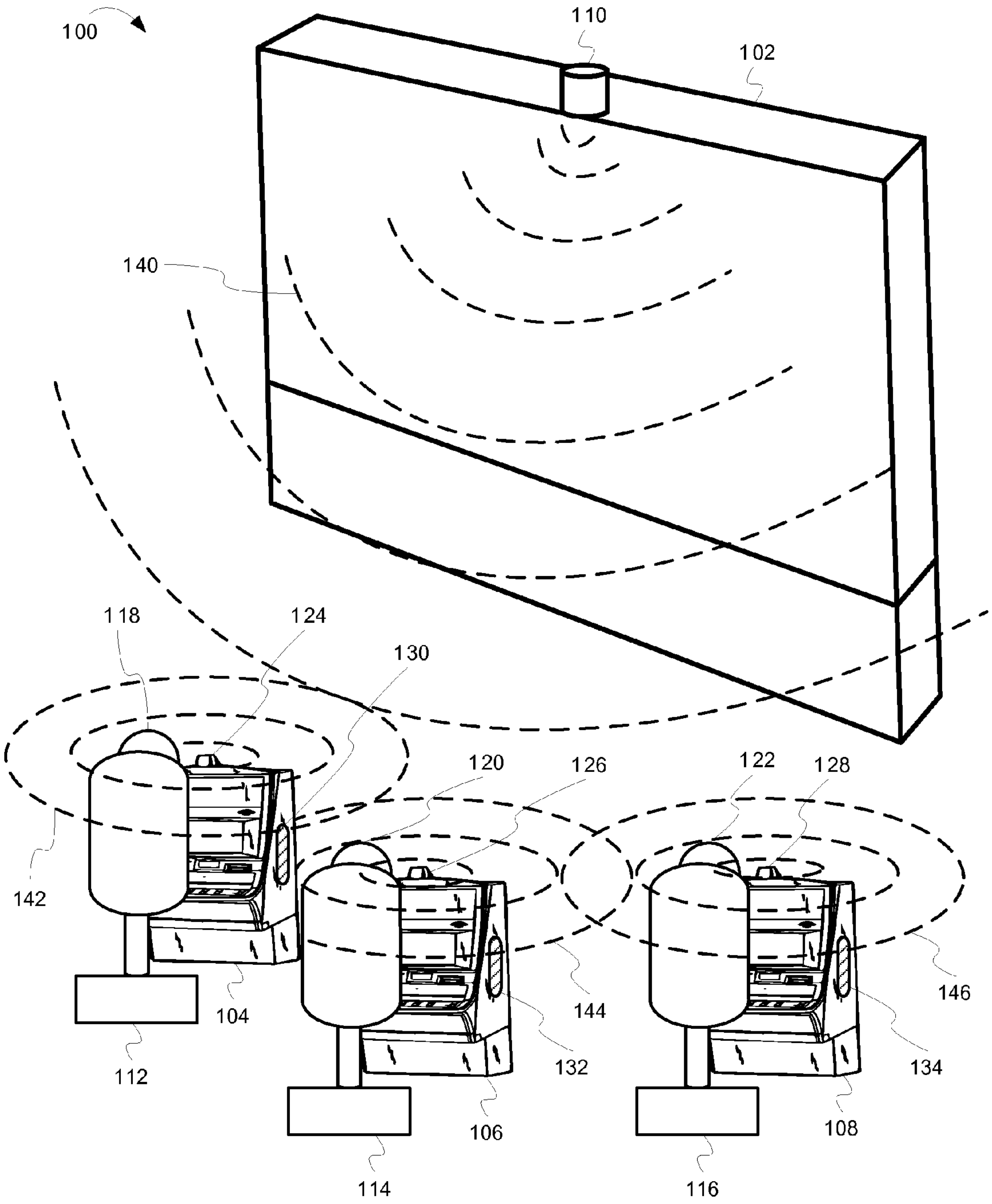
FIG. 1 depicts a wagering game system having motion sensing controllers, according to some example embodiments.

This description of the embodiments is divided into six sections. The first section provides an introduction to some example embodiments, while the second section provides system environments. The third section describes example operations performed by some example embodiments. The fourth section describes an example wagering game machine architecture and network environment. The fifth section describes an example wagering game machine and the sixth section presents some general comments.

Introduction

This section provides an introduction to some example embodiments. Some example embodiments integrate motion sensing controllers into a wagering game system. As further described below, wagering game players use motion sensing controllers that are part of a wagering game machine as input into the wagering game play. While described in reference to communal wagering game play that comprises multiple wagering game players that are each using a motion sensing controller, some example embodiments can include individual wagering game play. Also, while described in reference to magnetic fields, some example embodiments incorporate any other type of wireless transmissions (e.g., light).

The wagering game system can comprise individual wagering game machines for each wagering game player and a shared display for displaying the visual output of the communal wagering game play. Each wagering game machine can have a motion sensing controller. The wagering game players can use these motion sensing controllers to provide input to the communal wagering game play. In particular while holding the motion sensing controllers, the wagering game players can interact with items on the shared display (e.g., buttons) using gesture recognition, pointing, etc. The wagering game system captures this interaction and provides the gesture recognition, pointing, etc. as input into the communal wagering game play. For example, the wagering game player can move their hand holding the motion sensing controller to a bet button on the shared display and then select the bet button using the motion sensing controller to enable the wagering game player to bet.

In contrast to other systems that use motion sensing controllers (e.g., video games), accuracy of the input from the motion sensing controller is much more important in a wagering game system. In particular, the wagering game system can comprise a number of buttons being displayed, wherein selection of such buttons needs to be accurately captured based on the player input from the motion sensing controller. Otherwise, the incorrect input can affect outcomes of the wagering game play (e.g., monetary amount won by wagering game players can be affected). For example, if the buttons are close to each other, the wagering game player can accidently select the wrong button if the system cannot accurately capture the player movement. Accordingly, this can cause the wagering game player to select a button with unintended consequences (e.g., bet a different amount then intended).

Some example embodiments provide a wagering game system to ensure that the player input from the motion sensing controllers accurately tracks the player movement (and thus provide the wagering game player's intended input to the wagering game play). In some example embodiments, wireless emitters and receivers are used that provide an absolute position of the motion sensing controller by capturing data that represents three axes of position and three axes of rotation of the motion sensing controller.

Some example embodiments also comprise multiple wireless emitters and/or wireless receivers to ensure that the stationary components (e.g., the display, projectors outputting the video on the display, the wagering game machines, etc.) of the wagering game system do not move beyond an acceptable threshold level. Such movement of these stationary components can cause the wagering game system to inaccurately capture the player input from the motion sensing controllers. For example, if the display or the projectors providing the video for the display have moved, the wagering game system may incorrectly assume that the wagering game player is attempting to move to and select a button at position A on the display (because of the movement of the stationary components during wagering game play). However, because of this movement of the stationary components during wagering game play and from the standpoint of the wagering game player, the intent of the wagering game player was to move to and select a button at position B.

Some example embodiments also comprise multiple wireless emitters and/or wireless receivers to ensure that there is no electromagnetic interference or distortion of the wireless transmissions. For example, some component can be introduced in or around the system that can cause this electromagnetic distortion. An example of components that can cause this distortion can include an oxygen tank used by a wagering game player. Such distortion can occur during gameplay and can affect the gameplay measurements captured by the motion sensing controllers. As described above, if this distortion is great enough, the difference measurements during gameplay will be different from the difference measurements during calibration.

In some example embodiments, the wagering game system comprises at least two wireless emitters and a wireless receiver to track movement of the stationary components of the wagering game system, track distortion, etc. For example, a first wireless emitter can be fixedly positioned on the display; a second wireless emitter can be fixedly positioned on the wagering game machine; and the receiver can be located on or within the motion sensing controller that is associated with the wagering game machine. In operation and during calibration of the wagering game system, the motion sensing controller can be placed at a fixed position. For example, the motion sensing controller can be placed in a holder on the side of the wagering game machine. During calibration, the receiver in the motion sensing controller can then capture calibration signals from the two different emitters (a wireless transmission from the emitter on the display and a wireless transmission from the emitter on the wagering game machine). Each of these two wireless transmissions can be converted into data that represents three axes of position and three axes of rotation of the motion sensing controller. Also as further described below, the system can determine a difference between these two different sets of data from the two wireless transmissions.

After wagering game play is commenced, the motion sensing controller (along with the receiver) will be moving based on the wagering game player holding and moving the controller around for player input. The receiver in the motion sensing controller can continue to periodically capture a signal from the two different emitters (a gameplay wireless transmission from the emitter on the display and a gameplay wireless transmission from the emitter on the wagering game machine). Each of these two gameplay wireless transmissions can be converted into data that represents three axes of position and three axes of rotation of the motion sensing controller. Also, the system can determine a difference between these two different sets of data from the two gameplay wireless transmissions.

In some example embodiments, the differences between the calibration wireless transmissions are compared to the differences between the gameplay wireless transmissions. If the display (where the first emitter is fixedly positioned) and the wagering game machine (where the second emitter is fixedly positioned) have not moved, then the differences should be zero. In some example embodiments, the components can still be considered stationary for the system, if the difference is nonzero but still below an acceptable threshold level.

The wagering game system can be configured with other combinations of wireless emitters and wireless receivers for tracking movement of the stationary components of the wagering game systems, distortion of the wireless transmissions, etc. In another example, a wireless emitter can be positioned on or within the motion sensing controller, while two different wireless receivers on positioned on stationary components of the wagering game system (e.g., the display and the wagering game machine). In another example, more than two wireless emitters and/or more than two wireless receivers can be used. For example, a wireless receiver can be positioned on or within the motion sensing controller; a first wireless emitter is fixedly positioned on or near the display; a second wireless emitter is fixedly positioned on or near the wagering game machine; and a third wireless emitter is fixedly positioned on or near a projector that is outputting the video on the display.

In the examples described above, for each receiver or emitter in each of the motion sensing controllers there can be a counterpart emitter or receiver on or near the wagering game machine that is associated with each of the motion sensing controllers. Some other example embodiments are not limited to this one-to-one relationship. For example, each of the motion sensing controllers can include a wireless receiver and a wireless emitter is positioned on the display. Also, a second single wireless emitter can be positioned on any one of the wagering game machines. In operation, the wireless transmission from this second single wireless transmitter can be used for calibration and player movement across all of the wagering game machines. In particular, each of the receivers in the motion sensing controllers receives wireless transmissions from the wireless transmitter on the display and from the single wireless emitter on one of the wagering game machines. The determination of whether the display or the wagering game machine with the wireless emitter has moved can be made based on these wireless transmissions. Also, one or both of these wireless transmissions can be used to determine player movement for each of the wagering game machines.

Accordingly, these embodiments enable the system to determine whether any of the stationary components having an emitter or receiver have moved (as described above), distortion, interference, etc. As further described below, the system can perform one to a number of different operations in response to detection of movement of these stationary components, distortion, etc. For example, a real time adjustment can be performed to correct for this movement. In another example, an alarm can be triggered to notify an operator of the wagering game establishment. The operator can recalibrate the system to account for the movement of the components that were intended to be stationary, can take the system temporary offline, etc.

System Environments

This section describes example system environments and presents structural aspects of some example embodiments. This section includes different example wagering game systems that include motion sensing controllers. This section will discuss FIGS. 1-7. The discussion of FIG. 1 will describe a wagering game system that incorporates motion sensing controllers during calibration, wherein a wireless receiver is part of the motion sensing controllers, a wireless emitter is fixedly positioned on the shared display, and wireless emitters are fixedly positioned on each of the wagering game machines. The discussion of FIG. 2 will describe an example pair of a wireless emitter and a wireless receiver. The discussion of FIG. 3 will describe the wagering game system of FIG. 1 during wagering game play. The discussion of FIG. 4 will describe an example magnetic field that has been distorted. The discussion of FIG. 5 will describe a wagering game system that incorporates motion sensing controllers, wherein a wireless emitter is part of the motion sensing controllers, a wireless receiver is fixedly positioned on the shared display, and wireless receivers are fixedly positioned on each of the wagering game machines. The discussion of FIG. 6 will describe a wagering game system that incorporates motion sensing controllers, wherein a wireless receiver is part of the motion sensing controllers, a first wireless emitter is fixedly positioned on the shared display, and a second wireless emitter is fixedly positioned on a component in front of the wagering game machines. The discussion of FIG. 7 will describe a wagering game system that incorporates motion sensing controllers, wherein a wireless receiver is part of the motion sensing controllers, a wireless emitter is fixedly positioned on the shared display, wireless emitters are fixedly positioned on each of the wagering game machines, and wireless emitters are fixedly positioned on each of a number of projectors that project the video output on the shared display.

FIG. 1 depicts a wagering game system having motion sensing controllers, according to some example embodiments. In particular, FIG. 1 depicts a wagering game system 100 that includes a display 102, a wagering game machine 104, a wagering game machine 106, and a wagering game machine 108. Each of the wagering game machine 104, the wagering game machine 106, and the wagering game machine 108 can include a wagering game module that is executed to provide communal wagering game play that is playable by a wagering game player across the different wagering game machines 104-108. In some example embodiments, there is a position module within each wagering game machine that receives and processes the wireless transmissions received by the wireless receivers in the wagering game system 100.

Figure 12:
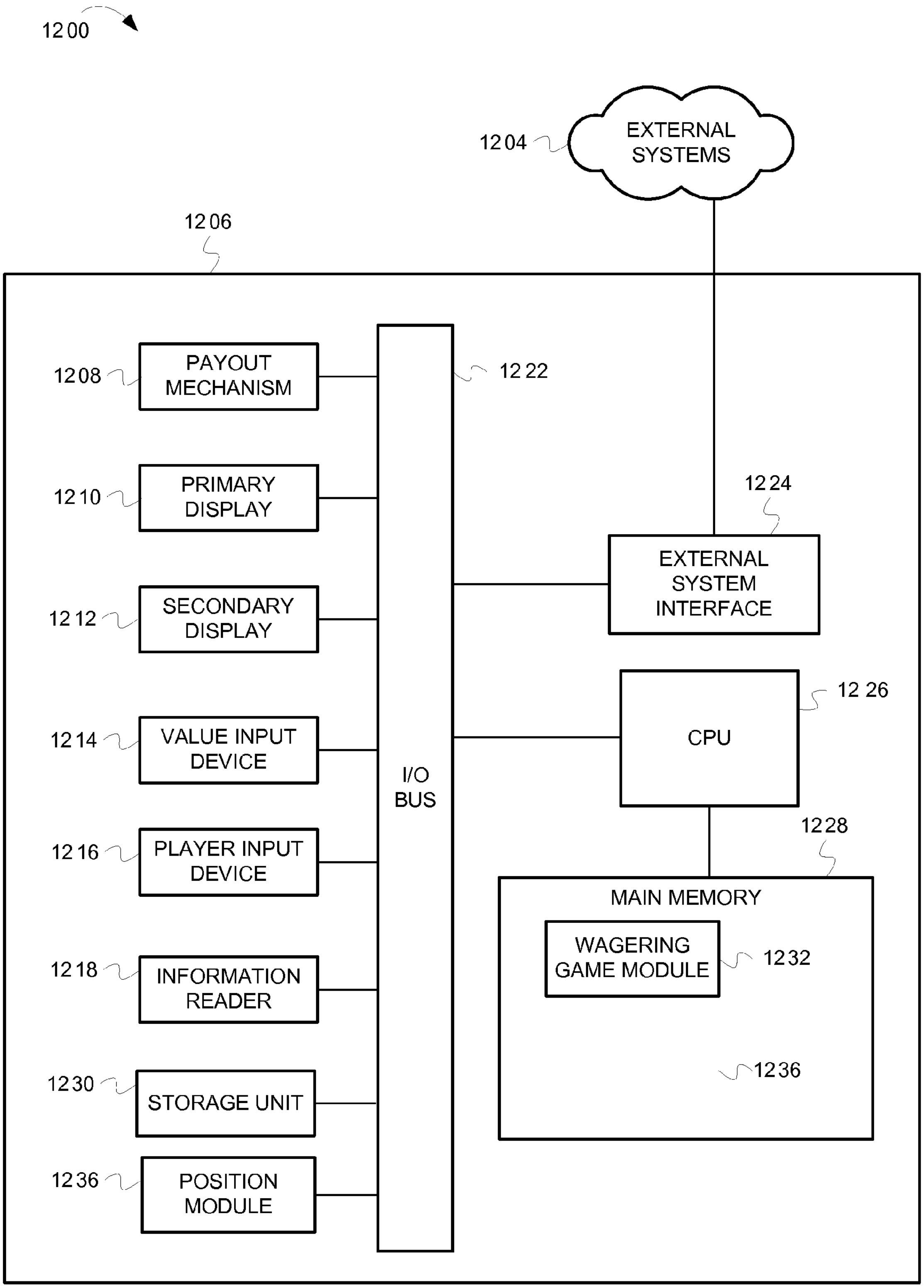
FIG. 12 is a block diagram illustrating a wagering game machine architecture, according to some example embodiments.

Also, the visual output from the communal wagering game play can be displayed on the display 102. Accordingly, the display 102, and the wagering game machines 104-108 are communicatively coupled together. An example of a wagering game machine architecture having a wagering game module and a position module is illustrated in FIG. 12, which is described in more detail below. The wagering game system 100 also includes a wireless emitter 110 that is fixedly positioned to the display 102. In this example, there is a single wireless emitter fixedly positioned to the display 102. In some other example embodiments, the wireless emitter 110 can be positioned at any other location on or near the display 102 that can be used to determine movement of the display 102 (as further described below). Also in some other example embodiments, there can be multiple wireless emitters fixedly positioned on the display 102 (e.g., opposite corners, all four corners, top and bottom, left and right, etc.).

The wagering game system 100 also includes wireless emitters fixedly positioned on each of the wagering game machines 104-108. A wireless emitter 124 is fixedly position on the wagering game machine 104. A wireless emitter 126 is fixedly positioned on the wagering game machine 106. A wireless emitter 128 is fixedly positioned on the wagering game machine 108. In this example, seats are provided for each of the wagering game machines. A seat 112 is positioned in front of the wagering game machine 104. A seat 114 is positioned in front of the wagering game machine 106. A seat 116 is positioned in front of the wagering game machine 108. A wagering game player 118 is seated in the seat 112 in front of the wagering game machine 104. A wagering game player 120 is seated in the seat 114 in front of the wagering game machine 106. A wagering game player 122 is seated in the seat 116 in front of the wagering game machine 108.

Each wagering game machine includes a motion sensing controller. The wagering game machine 104 includes a motion sensing controller 130. The wagering game machine 106 includes a motion sensing controller 132. The wagering game machine 108 includes a motion sensing controller 134. The motion sensing controller 130 is communicatively coupled to the position module for the wagering game machine 104. The motion sensing controller 132 is communicatively coupled to the position module for the wagering game machine 106. The motion sensing controller 134 is communicatively coupled to the position module for the wagering game machine 108. In some example embodiments, each of the motion sensing controllers 130-134 include a wireless receiver for receiving wireless transmissions from the wireless emitters.

As shown, the motion sensing controller 130 is positioned on the side of the wagering game machine 104. The motion sensing controller 132 is positioned on the side of the wagering game machine 106. The motion sensing controller 134 is positioned on the side of the wagering game machine 108. For example, some type of holder, pouch, etc. can be attached to the wagering game machines such that the motion sensing controllers can be placed in these holders, pouches, etc. during calibration of the wagering game system 100 and when a communal wagering game play is not occurring.

The example of FIG. 1 includes a time when the wagering game system 100 is being calibrated. In this example, the motion sensing controllers 130-134 are positioned in their holders, pouches, etc. on the sides of the wagering game machine 104-108. In particular, the motion sensing controllers 130-134 are located at known fixed positioned during calibration. Also, calibration can be initiated in response to an input (remotely or locally) from an operator of the wagering game system 100. For example, the operator can perform an administrative login at one of the wagering game machines 104-108 and provide some input to initiate the calibration of the wagering game system 100.

FIG. 1 depicts a number of calibration wireless transmissions being emitted, during calibration, by wireless emitters and being received by receivers in the motion sensing controllers. These calibration wireless transmissions can comprise magnetic fields (as further described below). A wireless emitter 110 fixedly positioned on top of the display 102 emits a calibration wireless transmission 140. A wireless emitter 124 fixedly positioned on top of the wagering game machine 104 emits a calibration wireless transmission 142. A wireless emitter 126 fixedly positioned on top of the wagering game machine 106 emits a calibration wireless transmission 144. A wireless emitter 128 fixedly positioned on top of the wagering game machine 108 emits a calibration wireless transmission 146.

In this example, each receiver in a motion sensing controller receives and captures two different calibration wireless transmissions. In particular, the receiver in the motion sensing controller 130 receives and captures the calibration wireless transmission 140 from the wireless emitter 110 and the calibration wireless transmission 142 from the wireless emitter 124. The receiver in the motion sensing controller 132 receives and captures the calibration wireless transmission 140 from the wireless emitter 110 and the calibration wireless transmission 144 from the wireless emitter 126. The receiver in the motion sensing controller 134 receives and captures the calibration wireless transmission 140 from the wireless emitter 110 and the calibration wireless transmission 146 from the wireless emitter 128. In this example, the receivers may receive the calibration wireless transmissions from other wireless emitters. However in this example, the receivers will not capture these additional calibration wireless transmissions. In some example embodiments, after capturing these calibration wireless transmissions, the receivers forward this data to the position module for further processing.

Figure 2:
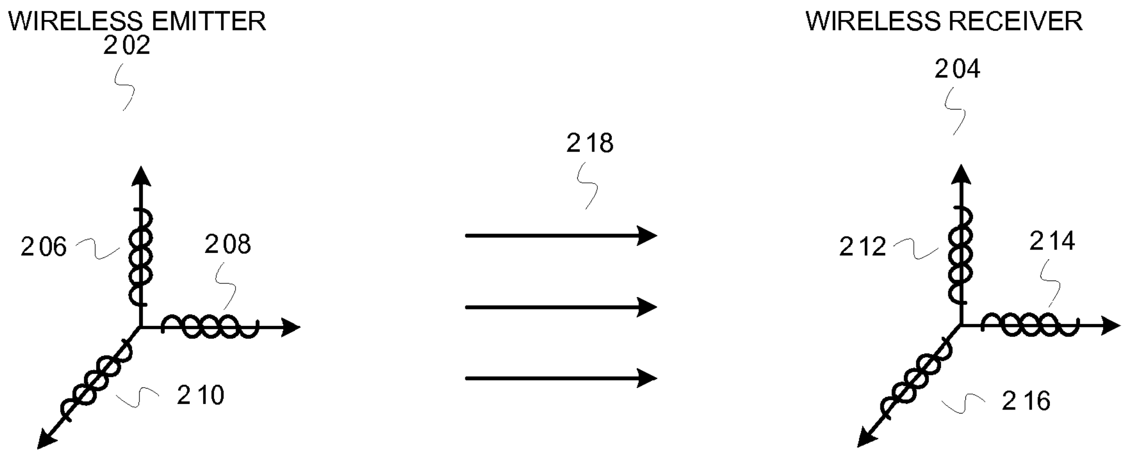
FIG. 2 depicts a three-axis electromagnetic emitter transmitting a magnetic field for receipt by a three-axis electromagnetic receiver, according to some example embodiments.

In some example embodiments, the emitters are three-axis electromagnetic sources that include three orthogonal antennas that output magnetic fields. In some example embodiments, the receivers are three-axis electromagnetic sensors that include three orthogonal antennas that receive the magnetic fields output from the emitters. To illustrate, FIG. 2 depicts a three-axis electromagnetic emitter transmitting a magnetic field for receipt by a three-axis electromagnetic receiver, according to some example embodiments. In particular, FIG. 2 depicts a wireless emitter 202 and a wireless receiver 204. The wireless emitter 202 includes three mutually orthogonal antennas—an antenna 206 (in the Y direction), an antenna 208 (in the X direction), and an antenna 210 (in the Z direction). The wireless receiver 204 includes mutually three orthogonal antennas—an antenna 212 (in the Y direction), an antenna 214 (in the X direction), and an antenna 216 (in the Z direction). In operation, an electrical signal is applied to the antennas 204-208 to generate magnetic fields 218 that are received by the antennas 212-216. In some example embodiments, each of the antennas 204-208 generates distinguishable fields relative to each other (using for example, time division multiplexing, frequency division multiplexing, phase multiplexing, etc.). While described as comprising three axes, in some other example embodiments, the electromagnetic sources and receivers can comprise a lesser or greater number of axes.

In some example embodiments, the position module in the wagering game machine receives the data representing the received magnetic fields and converts the analog signals into digital data. The position module can be any combination of software, hardware, and firmware that converts the analog signal to digital data. For example, the position module can include a time division multiplexer, an amplifier, a demodulator and a low pass filter that are used to convert the analog signals into digital data.

In some example embodiments, the position module processes each of the two calibration wireless transmissions (the analog signal) to produce six different data values that represent the position and angle of the wireless emitter to the wireless receiver: three linear measurements (X component, Y component, and Z component) and three angular measurements (X component, Y component, and Z component). In Table 1 below is an example (for the receiver in the motion sensing controller 130) of the six values for the position and orientation for each of the two calibration wireless transmissions:

TABLE 1

| Calibration Wireless Transmissions | X Comp. Linear Measure | Y Comp. Linear Measure | Z Comp. Linear Measure | X Comp. Angular Measure | Y Comp. Angular Measure | Z Comp. Angular Measure |
|---|---|---|---|---|---|---|
| Transmission 140 | 50 | 30 | 5 | 45° | 20° | 15° |
| Transmission 142 | 40 | 50 | 10 | 35° | 10° | 25° |

The position module also determines a difference for each of the six measurements (as shown in Table 2):

TABLE 2

| | X Comp. Linear Measure | Y Comp. Linear Measure | Z Comp. Linear Measure | X Comp. Angular Measure | Y Comp. Angular Measure | Z Comp. Angular Measure |
|---|---|---|---|---|---|---|
| Difference Values between transmission 140 and transmission 142 | 10 | −20 | −5 | 10° | 10° | −10° |

Similarly, a same or different position module can generate the six different measurements for the calibration wireless transmissions received by the receivers in the motion sensing controllers 132 and 134. The position module can also determine a difference for each of the six measurements. These differences in measurements are stored as calibration measurements for each of the three motion sensing controllers. As further described below, these calibration measurements are compared to similar measurements taken during wagering game play. Also as further described below, based on the comparisons a determination is made of whether the display 102 or the wagering game machines 104-108 have moved, a determination is made of whether some type interference or distortion affecting the magnetic fields, etc.

While described in reference to magnetic fields, some example embodiments incorporate any other type of wireless transmissions (e.g., light). For example, the wireless emitters can include one-dimensional point sources (LEDs) and the wireless receivers can include either two-dimensional (returning two angles) or one dimensional (returning one angle). This configuration can affect the minimum number of emitters and receivers sufficient to calculate the position and orientation of the motion controllers.

Figure 3:
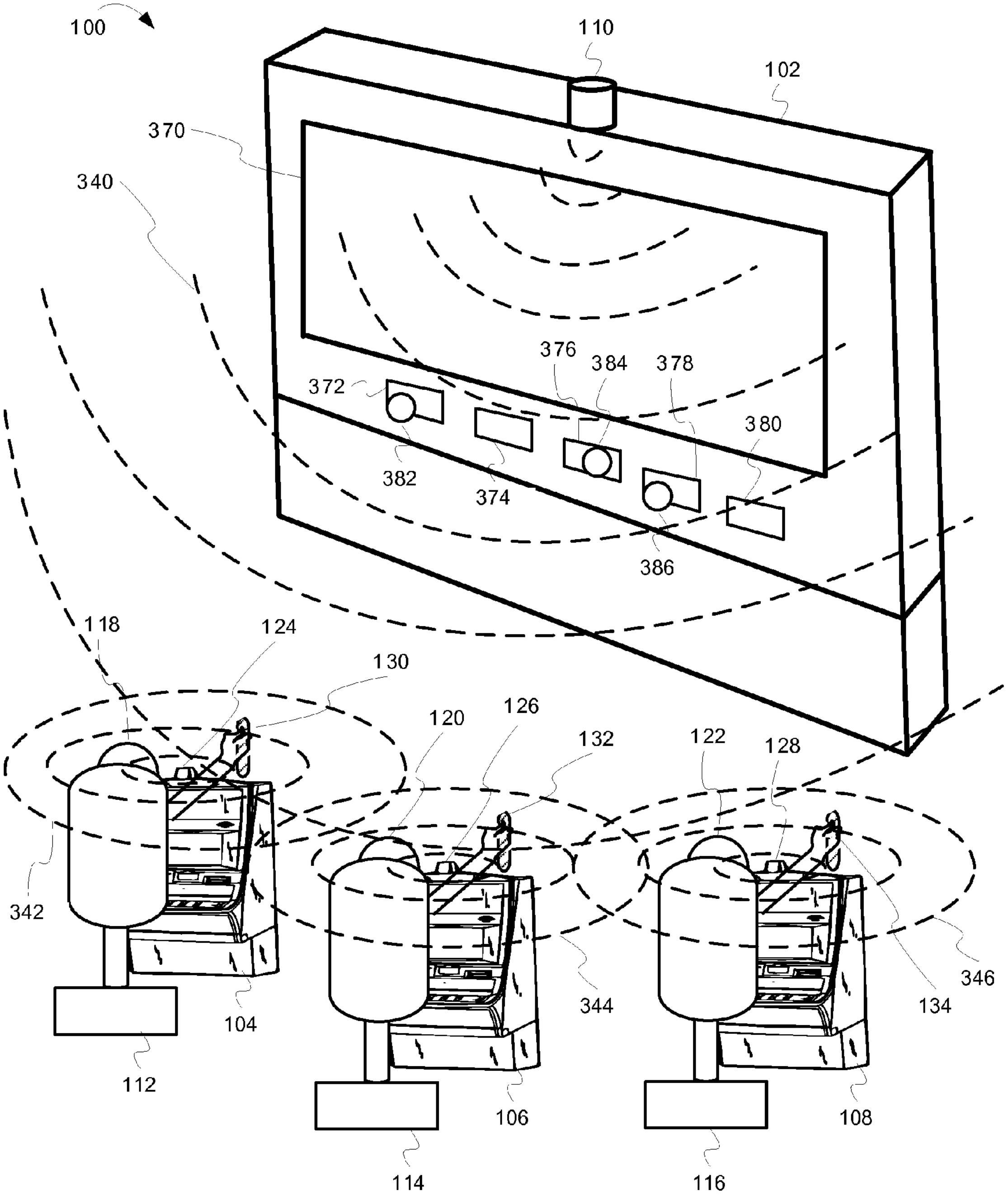
FIG. 3 depicts the wagering game system of FIG. 1 having motion sensing controllers during wagering game play, according to some example embodiments.

FIG. 3 depicts the wagering game system of FIG. 1 having motion sensing controllers during wagering game play, according to some example embodiments. In FIG. 3, the three different wagering game players—the wagering game player 118, the wagering game player 120, and the wagering game player 122—are using their motion sensing controllers—the motion sensing controller 130, the motion sensing controller 132, and the motion sensing controller 134, respectively—to provide input into communal wagering game play that is being displayed on the display 102. In particular while holding the motion sensing controllers, the wagering game players can interact with items on the display 102 (e.g., buttons) using gesture recognition, pointing, etc. The position module processes this interaction and provides the gesture recognition, pointing, etc. as input into the communal wagering game play. For example, the wagering game player can move their hand holding the motion sensing controller to point to a bet button on the shared display and then select the bet button using the motion sensing controller to enable the wagering game player to bet. In particular, the position module determines movement of the motion sensing controllers based on the wireless transmissions being emitted from the wireless emitters (similar to the determinations for calibration for FIG. 1 described above).

In addition to the components of FIG. 1, FIG. 3 includes a display of components as part of the communal wagering game play on the display 102. In particular, the communal wagering game play includes a section 370 that provides the actual game play. For example, the section 370 can display spinning reels, numbers for bingo communal wagering game play, etc. The communal wagering game play can also include a display of a number of buttons 372-380 to allow the wagering game players to wager different amounts, initiate game play, cash out, etc. The display 102 also displays a number of cursors—a cursor 382, a cursor 384, and a cursor 386—that are associated with the motion sensing controllers 130-134. The cursor 382 is associated with the motion sensing controller 134 and tracks player movement and game play input for the wagering game player 122. The cursor 384 is associated with the motion sensing controller 132 and tracks player movement and game play input for the wagering game player 120. The cursor 386 is associated with the motion sensing controller 130 and tracks player movement and game play input for the wagering game player 118. While illustrated such that the selectable buttons/areas are separate the section 370 that includes the actual game play, in some other example embodiments, there can be selectable buttons/areas within the section 370 that includes the actual game play.

FIG. 3 depicts a number of gameplay wireless transmissions being emitted, during communal wagering game play, by wireless emitters and being received by receivers in the motion sensing controllers. These gameplay wireless transmissions can comprise magnetic fields (as described above). The wireless emitter 110 fixedly positioned on top of the display 102 emits a gameplay wireless transmission 340. The wireless emitter 124 fixedly positioned on top of the wagering game machine 104 emits a gameplay wireless transmission 342. The wireless emitter 126 fixedly positioned on top of the wagering game machine 106 emits a gameplay wireless transmission 344. The wireless emitter 128 fixedly positioned on top of the wagering game machine 108 emits a gameplay wireless transmission 146.

In this example, each receiver in a motion sensing controller receives and captures two different gameplay wireless transmissions. In particular, the receiver in the motion sensing controller 130 receives and captures the gameplay wireless transmission 340 from the wireless emitter 110 and the gameplay wireless transmission 342 from the wireless emitter 124. The receiver in the motion sensing controller 132 receives and captures the gameplay wireless transmission 340 from the wireless emitter 110 and the gameplay wireless transmission 344 from the wireless emitter 126. The receiver in the motion sensing controller 134 receives and captures the gameplay wireless transmission 340 from the wireless emitter 110 and the gameplay wireless transmission 346 from the wireless emitter 128. In this example, the receivers may receive the gameplay wireless transmissions from other wireless emitters. However in this example, the receivers will not capture these additional gameplay wireless transmissions.

In some example embodiments, after capturing these gameplay wireless transmissions, the receivers forward this data to a position module for further processing. In some example embodiments, there is a position module within each wagering game machine.

In some example embodiments, the position module processes each of the two gameplay wireless transmissions (the analog signal) to produce six different data values that represent the position and angle of each of the wireless emitters to the wireless receiver: three linear measurements (X component, Y component, and Z component) and three angular measurements (X component, Y component, and Z component). Table 3 below is an example (for the receiver in the motion sensing controller 130) of the six values for the position and orientation for each of the two gameplay wireless transmissions:

TABLE 3

| Gameplay Wireless Transmissions | X Comp. Linear Measure | Y Comp. Linear Measure | Z Comp. Linear Measure | X Comp. Angular Measure | Y Comp. Angular Measure | Z Comp. Angular Measure |
|---|---|---|---|---|---|---|
| Transmission 340 | 70 | 40 | 15 | 65° | 50° | 25° |
| Transmission 342 | 40 | 60 | 20 | 45° | 40° | 35° |

The position module can use values from one or both of the gameplay wireless transmissions 340 and 342 to determine gameplay movement. In particular, based on these values, the wagering game module in the wagering game machine 104 can update the movement of the cursor 386 by determining where the wireless controller is pointing on the communal display 102.

In some example embodiments, these values from the gameplay wireless transmissions 340 and 342 can also be used to determine if there was movement of one or some of the stationary components of the wagering game system 100, interference or distortion of the gameplay wireless transmissions 340-342. The position module also determines a difference for each of the six measurements:

TABLE 4

| | X Comp. Linear Measure | Y Comp. Linear Measure | Z Comp. Linear Measure | X Comp. Angular Measure | Y Comp. Angular Measure | Z Comp. Angular Measure |
|---|---|---|---|---|---|---|
| Difference Values between transmission 340 and transmission 342 | 30 | −20 | −5 | 20° | 10° | −10° |

Similarly, a same or different position module can generate the six different measurements for the gameplay wireless transmissions received by the receivers in the motion sensing controllers 132 and 134. The position module can also determine a difference for each of the six measurements. These differences in measurements can be compared to the calibration measurements for each of the three motion sensing controllers (as described above). Returning to the example of the differences from FIG. 1 and illustrated in Table 2 for the calibration wireless transmissions, these differences are compared to the differences during gameplay illustrated in FIG. 4. Table 5 shows the differences between the two transmissions for calibration and the two transmissions for the gameplay for each of the six measurements

TABLE 5

| | X Comp. Linear Measure | Y Comp. Linear Measure | Z Comp. Linear Measure | X Comp. Angular Measure | Y Comp. Angular Measure | Z Comp. Angular Measure |
|---|---|---|---|---|---|---|
| Difference Values between calibration transmissions and gameplay transmissions | 20 | No change | No change | 10° | No change | No change |

As shown, two of the difference measurements are different calibration and gameplay: 20 for the X component linear measurement and 10° for the X component for angular measurement. If there were no distortion of the transmissions and/or no movement of the stationary components of the wagering game system 100, all six difference measurements would be 0 or no change. In some example embodiments, if any of these six difference measurements is nonzero or changed, then there is distortion and/or movement of the stationary components of the wagering game system 100. In some example embodiments, if one or more of the difference measurements are nonzero or changed but are below an acceptable threshold level, then the wagering game system 100 is still considered to not have distortion of the transmissions and no movement of the stationary components of the wagering game system 100. In some example embodiments, if two or more of these six difference measurements is nonzero or changed (and/or beyond the acceptable threshold level), then there is distortion and/or movement of the stationary components of the wagering game system 100. In some example embodiments, if all six difference measurements are nonzero or changed (and/or beyond the acceptable threshold level), then there is distortion and/or movement of the stationary components of the wagering game system 100.

The wagering game system 100 can perform one to a number of different operations in response to detection of movement of these stationary components, interference, distortion, etc. For example, a real time adjustment can be performed to correct for this movement, interference, distortion, etc. In another example, an alarm can be triggered to notify an operator of the wagering game establishment. The operator can recalibrate the wagering game system 100 to account for the stationary movement, interference, distortion, etc., can take the system temporary offline, etc. In some example embodiments, the response to this movement, distortion can be dependent on the number of difference measurements that are nonzero. For example, if the number of difference measurements is greater than three, then a recalibration is performed. In some example embodiments, the response is based on the difference measurements across multiple receiver/emitter combinations. For example, if two different receiver/emitter combinations have at least one nonzero difference measurement, the wagering game system 100 is taken offline. Also, this response can also be dependent on difference measurements across multiple wagering game systems. For example, if there are at least two difference measurements across any receiver/emitter combinations for a number of wagering game systems, the response can comprise an alarm and having the wagering game systems taken offline.

Figure 4:
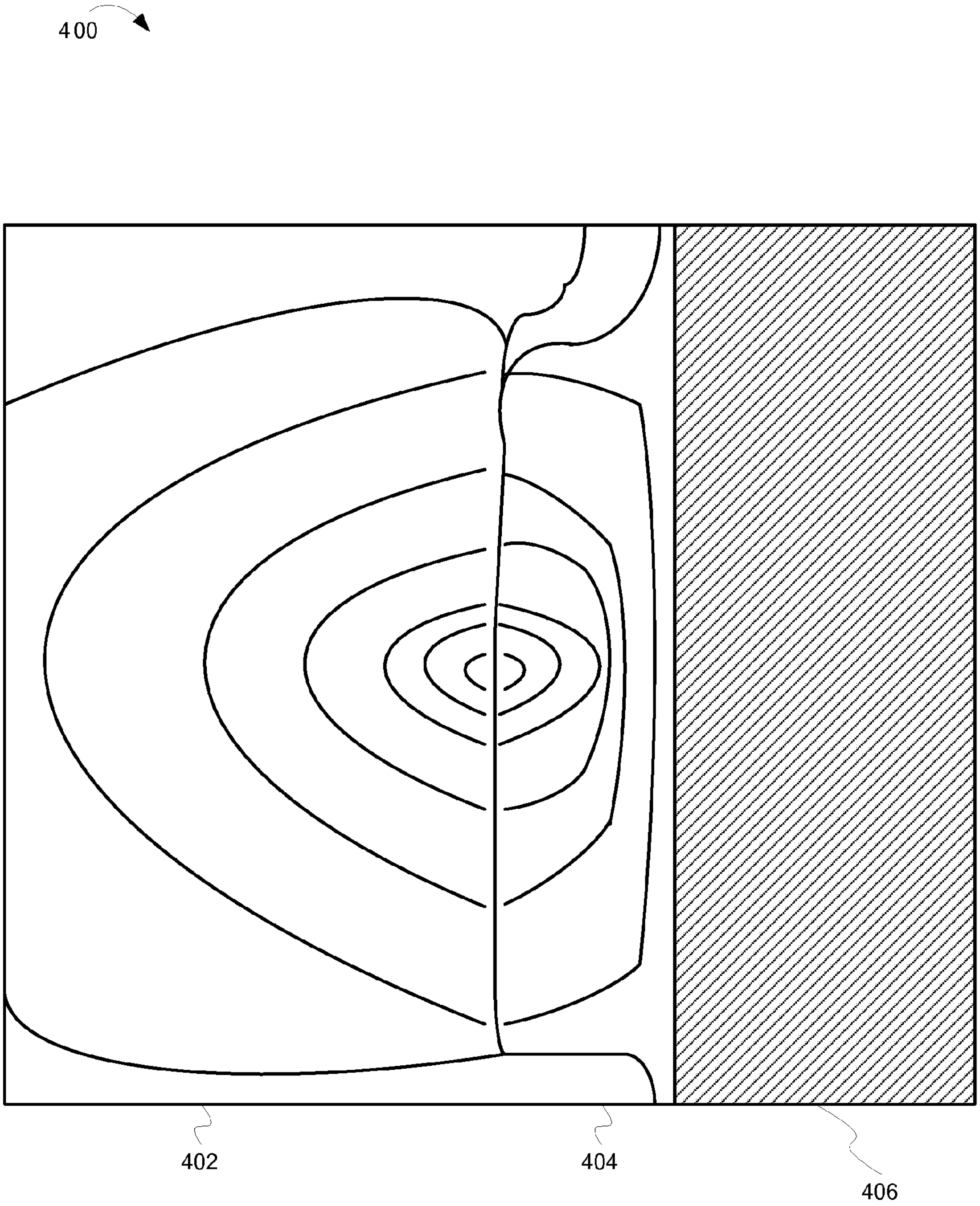
FIG. 4 depicts a magnetic field that has been distorted, according to some example embodiments.

FIG. 4 depicts a magnetic field that has been distorted, according to some example embodiments. In particular, FIG. 4 depicts a magnetic field 400 which can be representative of a wireless transmission that has been distorted. The magnetic field is represented in the field section 402 by lines 40× of equal magnetic strength. The magnetic field 400 includes a field section 402 that is undistorted and a field section 404 that is distorted. In particular, some component in or around the transmission is causing the magnetic field in the field section 404 to be collapsed inward. For example, a solid component 406 can be causing this distortion. An example of components that can cause this distortion can include an oxygen tank used by a wagering game player. Another example can include embedded and static coils in components of the wagering game system 100 (e.g., the wagering game machines). Such distortion can occur during gameplay and can affect the gameplay measurements captured by the motion sensing controllers. As described above, if this distortion is great enough, the difference measurements during gameplay will be different from the difference measurements during calibration. The wagering game system 100 can then respond a number of different ways (as described above).

Figure 5:
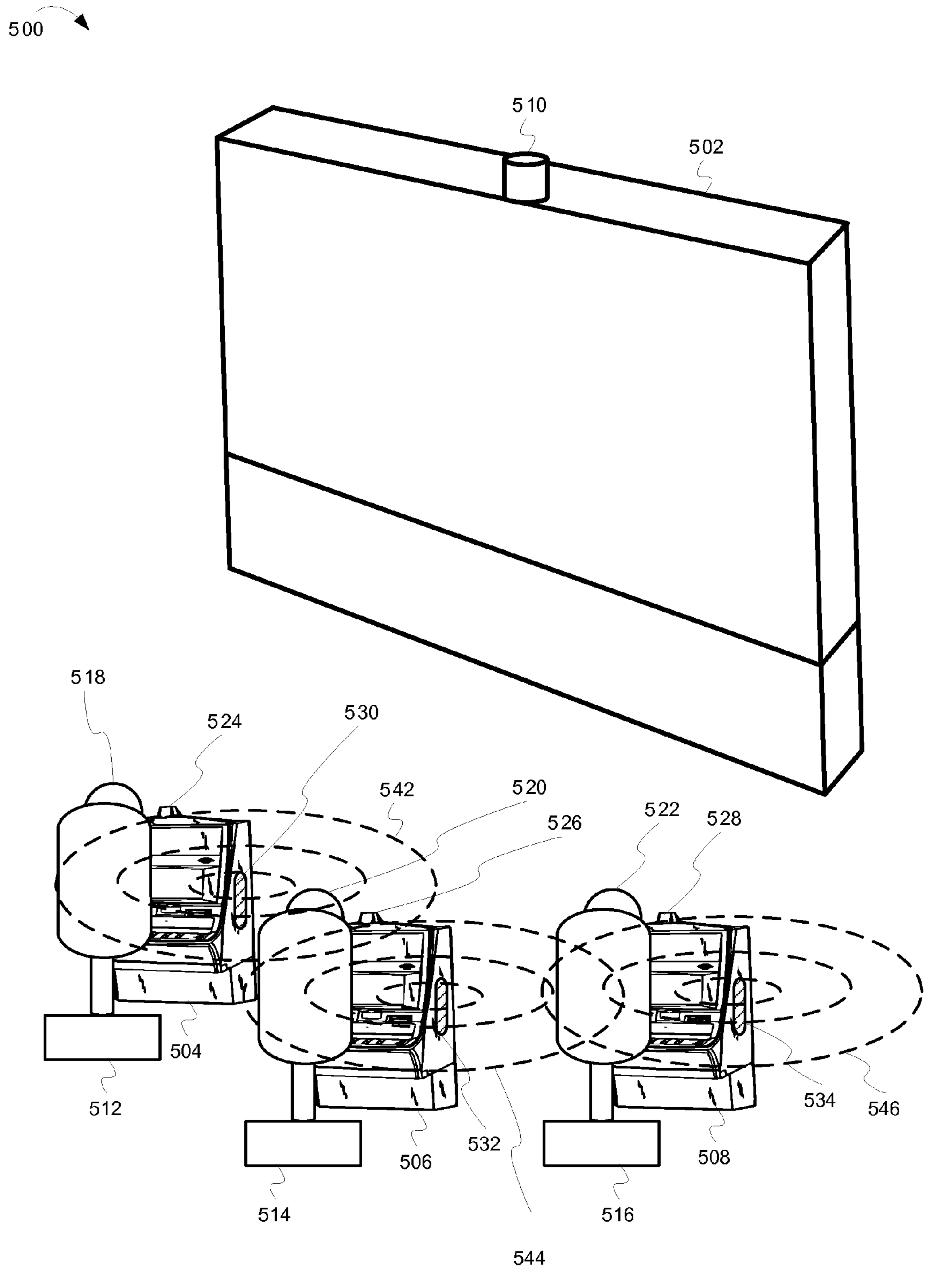
FIG. 5 depicts a wagering game system having motion sensing controllers that include a wireless emitter, wherein multiple wireless receivers are fixedly position to receive, according to some example embodiments.

FIG. 5 depicts a wagering game system having motion sensing controllers that include a wireless emitter, wherein multiple wireless receivers are fixedly positioned to receive, according to some example embodiments. In contrast to the wagering game system 100 illustrated in FIGS. 1 and 3, FIG. 5 depicts a wagering game system 500 wherein the positions of the wireless emitters and receivers are switched. In particular, the wagering game system 500 includes the motion sensing controllers having a wireless emitter and the wireless receivers fixedly positioned to the shared display and the wagering game machines.

The wagering game system 500 that includes a display 502, a wagering game machine 504, a wagering game machine 506, and a wagering game machine 508. Each of the wagering game machine 504, the wagering game machine 506, and the wagering game machine 508 can include a wagering game module that is executed to provide communal wagering game play that is playable by a wagering game player across the different wagering game machines 504-508. In some example embodiments, there is a position module within each wagering game machine that receives and processes the wireless transmissions received by the wireless receivers in the wagering game system 500.

Also, the visual output from the communal wagering game play can be displayed on the display 502. Accordingly, the display 502, and the wagering game machines 504-508 are communicatively coupled together. An example of a wagering game machine architecture having a wagering game module and a position module is illustrated in FIG. 12, which is described in more detail below. The wagering game system 500 also includes a wireless receiver 510 that is fixedly positioned to the display 502. In this example, there is a single wireless receiver fixedly positioned to the display 502. In some other example embodiments, the wireless receiver 510 can be positioned at any other location on or near the display 502 that can be used to determine movement of the display 502 (as further described below). Also in some other example embodiments, there can be multiple wireless receivers fixedly positioned on the display 502 (e.g., opposite corners, all four corners, top and bottom, left and right, etc.).

The wagering game system 500 also includes wireless receivers fixedly positioned on each of the wagering game machines 504-508. A wireless receiver 524 is fixedly positioned on the wagering game machine 504. A wireless receiver 526 is fixedly positioned on the wagering game machine 506. A wireless receiver 528 is fixedly positioned on the wagering game machine 508. In this example, seats are provided for each of the wagering game machines. A seat 512 is positioned in front of the wagering game machine 504. A seat 514 is positioned in front of the wagering game machine 506. A seat 516 is positioned in front of the wagering game machine 508. A wagering game player 518 is seated in the seat 512 in front of the wagering game machine 504. A wagering game player 520 is seated in the seat 514 in front of the wagering game machine 506. A wagering game player 522 is seated in the seat 516 in front of the wagering game machine 508.

Each wagering game machine includes a motion sensing controller. The wagering game machine 504 includes a motion sensing controller 530. The wagering game machine 506 includes a motion sensing controller 532. The wagering game machine 508 includes a motion sensing controller 534. The motion sensing controller 530 is communicatively coupled to the position module for the wagering game machine 504. The motion sensing controller 532 is communicatively coupled to the position module for the wagering game machine 506. The motion sensing controller 534 is communicatively coupled to the position module for the wagering game machine 508. In some example embodiments, each of the motion sensing controllers 530-534 include a wireless emitter for transmitting wireless transmissions that are received by the wireless receivers.

The motion sensing controllers 530-534 are positioned for calibration (similar to FIG. 1) and can be used for gameplay by the wagering game players (similar to FIG. 3). The motion sensing controller 530 is positioned on the side of the wagering game machine 504. The motion sensing controller 532 is positioned on the side of the wagering game machine 506. The motion sensing controller 534 is positioned on the side of the wagering game machine 508. For example, some type of holder, pouch, etc. can be attached to the wagering game machines such that the motion sensing controllers can be placed in these holders, pouches, etc. during calibration of the wagering game system 500 and when a communal wagering game play is not occurring.

The example of FIG. 5 includes a time when the wagering game system 500 is being calibrated. In this example, the motion sensing controllers 530-534 are positioned in their holders, pouches, etc. on the sides of the wagering game machines 504-508. In particular, the motion sensing controllers 530-534 are located at known fixed positioned during calibration. Also, calibration can be initiated in response to an input (remotely or locally) from an operator of the wagering game system 500. For example, the operator can perform an administrative login at one of the wagering game machines 504-508 and provide some input to initiate the calibration of the wagering game system 500.

FIG. 5 depicts a number of wireless transmissions being emitted, during calibration and gameplay, by wireless emitters in the motion sensing controllers and being received by the wireless receivers. These wireless transmissions can comprise magnetic fields. A wireless emitter in the motion sensing controller 530 emits a wireless transmission 542. A wireless emitter in the motion sensing controller 532 emits a wireless transmission 544. A wireless emitter in the motion sensing controller 534 emits a wireless transmission 546.

In this example, the wireless receiver 524 receives and captures the wireless transmission 542 emitted from the wireless emitter in the motion sensing controller 530. The wireless receiver 526 receives and captures the wireless transmission 544 emitted from the wireless emitter in the motion sensing controller 532. The wireless receiver 528 receives and captures the wireless transmission 546 emitted from the wireless emitter in the motion sensing controller 534. Also, the wireless receiver 510 receives and captures the wireless transmission 542, the wireless transmission 544, and the wireless transmission 546. In this example, the receivers may receive the wireless transmissions from other wireless emitters. However in this example, the receivers will not capture these additional wireless transmissions.

In some example embodiments, after capturing these wireless transmissions, the receivers forward this data to the position module for further processing. In some example embodiments, the emitters are three-axis electromagnetic sources that include three orthogonal antennas that output magnetic fields. In some example embodiments, the receivers are three-axis electromagnetic sensors that include three orthogonal antennas that receive the magnetic fields output from the emitters (see description of FIG. 2 above). While described as comprising three axes, in some other example embodiments, the electromagnetic sources and receivers can comprise a lesser or greater number of axes.

In some example embodiments, the position module in the wagering game machine receives the data representing the received magnetic fields and converts the analog signals into digital data. The position module can be any combination of software, hardware, and firmware that converts the analog signal to digital data. For example, the position module can include a time division multiplexer, an amplifier, a demodulator and a low pass filter that are used to convert the analog signals into digital data.

In this example for each motion sensing controller, the position module processes each of the two wireless transmissions (the analog signal) to produce six different data values that represent the position and angle of each of the wireless emitter to the wireless receiver: three linear measurements (X component, Y component, and Z component) and three angular measurements (X component, Y component, and Z component). See example in Table 1 above. The position module also determines a difference for each of the six measurements (see example in Table 2 above).

Similarly, a same or different position module can generate the six different measurements for the wireless transmissions received by the receivers in the motion sensing controllers. The position module can also determine a difference for each of the six measurements. If these are calibration wireless transmissions, these differences in measurements are stored as calibration measurements for each of the three motion sensing controllers.

As described above in reference to FIG. 3 if these are gameplay wireless transmissions, the position module can use values from one or both of the gameplay wireless transmissions to determine gameplay movement for a given motion sensing controller. In particular, based on these values, the wagering game module in the wagering game machine can update the movement of the cursor on the display (as described in reference to FIG. 3).

In some example embodiments, these values from the gameplay wireless transmissions can also be used to determine if there was movement of one or some of the stationary components of the wagering game system 500, interference or distortion of the gameplay wireless transmissions. The position module also determines a difference for each of the six measurements (see example in Table 4 above).

Similarly, a same or different position module can generate the six different measurements for the gameplay wireless transmissions received by the receivers for each of the motion sensing controllers. The position module can also determine a difference for each of the six measurements. These differences in measurements can be compared to the calibration measurements for each of the three motion sensing controllers (see example in Table 5 above).

If there were no distortion of the transmissions and/or no movement of the stationary components of the wagering game system 500, all six difference measurements would be 0 or no change. In some example embodiments, if any of these six difference measurements is nonzero or changed, then there is distortion and/or movement of the stationary components of the wagering game system 500. In some example embodiments, if one or more of the difference measurements are nonzero or changed but are below an acceptable threshold level, then the wagering game system 500 is still considered to not have distortion of the transmissions and no movement of the stationary components of the wagering game system 500. In some example embodiments, if two or more of these six difference measurements is nonzero or changed (and/or beyond the acceptable threshold level), then there is distortion and/or movement of the stationary components of the wagering game system 500. In some example embodiments, if all six difference measurements are nonzero or changed (and/or beyond the acceptable threshold level), then there is distortion and/or movement of the stationary components of the wagering game system 500.

The wagering game system 500 can perform one to a number of different operations in response to detection of movement of these stationary components, interference, distortion, etc. For example, a real time adjustment can be performed to correct for this movement, interference, distortion, etc. In another example, an alarm can be triggered to notify an operator of the wagering game establishment. The operator can recalibrate the wagering game system 500 to account for the stationary movement, interference, distortion, etc., can take the system temporary offline, etc. In some example embodiments, the response to this movement, distortion can be dependent on the number of difference measurements that are nonzero. For example, if the number of difference measurements is greater than three, then a recalibration is performed. In some example embodiments, the response is based on the difference measurements across multiple receiver/emitter combinations. For example, if two different receiver/emitter combinations have at least one nonzero difference measurement, the wagering game system 500 is taken offline. Also, this response can also be dependent on difference measurements across multiple wagering game systems. For example, if there are at least two difference measurements across any receiver/emitter combinations for a number of wagering game systems, the response can comprise an alarm and having the wagering game systems taken offline.

Figure 6:
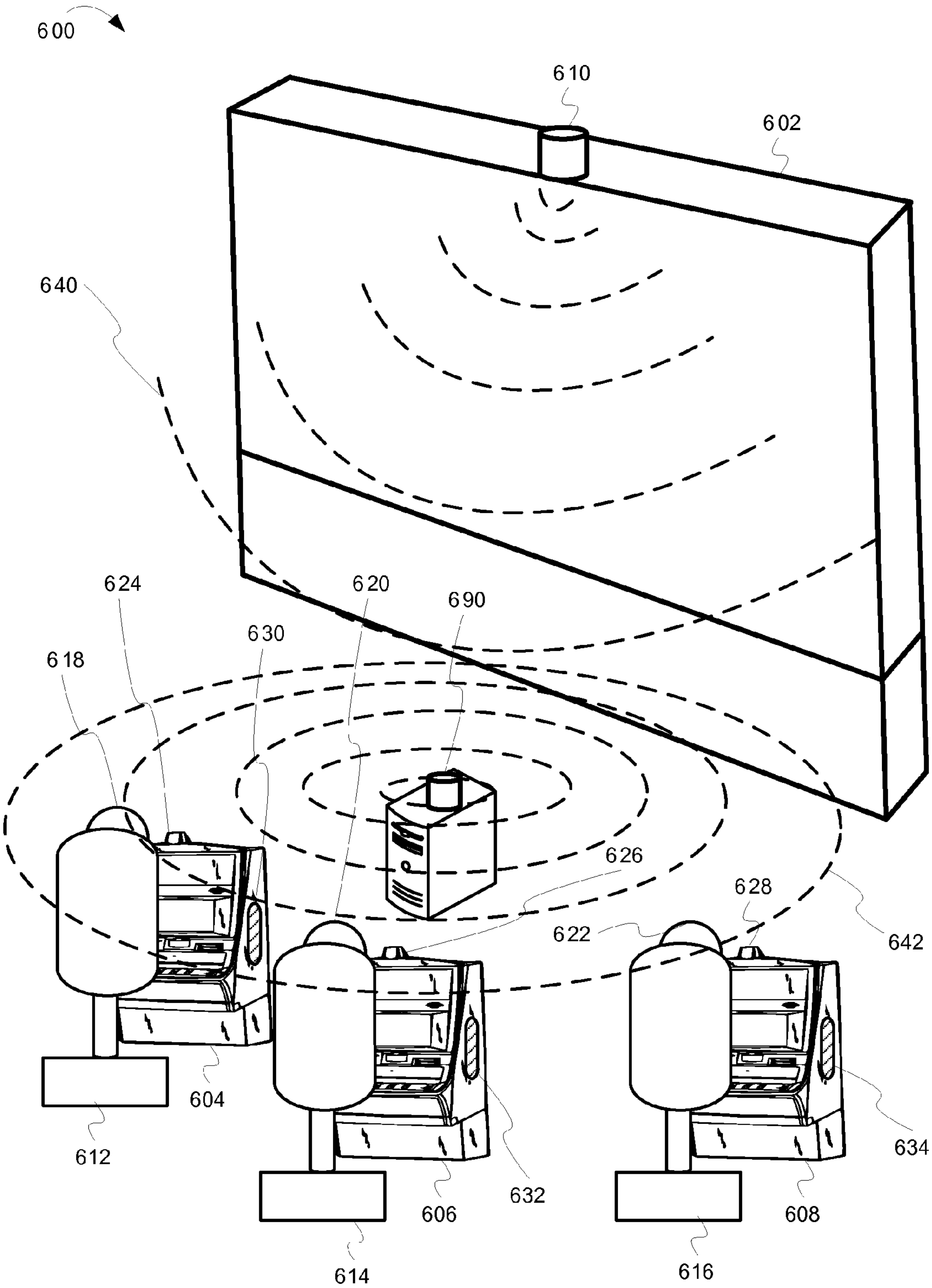
FIG. 6 depicts a wagering game system having motion sensing controllers having wireless receivers and multiple wireless emitters, wherein one or more of the wireless emitters is fixedly positioned and shared across multiple wireless receivers, according to some example embodiments.

FIG. 6 depicts a wagering game system having motion sensing controllers having wireless receivers and multiple wireless emitters, wherein one or more of the wireless emitters is fixedly positioned and shared across multiple wireless receivers, according to some example embodiments. In contrast to the wagering game system 100 illustrated in FIGS. 1 and 3, FIG. 6 depicts a wagering game system 600 wherein two wireless emitters at fixed positions provided wireless transmissions that are shared and processed by receivers in each of the different motion sensing controllers for the different wagering game machines. In other words in this example, there is not a one-to-one relationship between a motion sensing controller and a wireless emitter on the associated wagering game machine. In this example, the second wireless emitter is located on a central component that is separate from the wagering game machines.

The wagering game system 600 that includes a display 602, a wagering game machine 604, a wagering game machine 606, and a wagering game machine 608. Each of the wagering game machine 604, the wagering game machine 606, and the wagering game machine 608 can include a wagering game module that is executed to provide communal wagering game play that is playable by a wagering game player across the different wagering game machines 604-608. In some example embodiments, there is a position module within each wagering game machine that receives and processes the wireless transmissions received by the wireless receivers in the wagering game system 600.

Also, the visual output from the communal wagering game play can be displayed on the display 602. Accordingly, the display 602, and the wagering game machines 604-608 are communicatively coupled together. An example of a wagering game machine architecture having a wagering game module and a position module is illustrated in FIG. 12, which is described in more detail below. The wagering game system 600 also includes a wireless emitter 610 that is fixedly positioned to the display 602. In this example, there is a single wireless emitter fixedly positioned to the display 602. In some other example embodiments, the wireless emitter 610 can be positioned at any other location on or near the display 602 that can be used to determine movement of the display 602 (as further described below). Also in some other example embodiments, there can be multiple wireless emitters fixedly positioned on the display 602 (e.g., opposite corners, all four corners, top and bottom, left and right, etc.).

The wagering game system 600 also includes a wireless emitter 690 fixedly positioned. In this example, the wireless emitter 690 is fixedly positioned on a component centrally located between the wagering game machines 604-608 and the display 602. In some other example embodiments, the wireless emitter 690 can be positioned in any other fixed location that is in communication range of the motion sensing controllers of the wagering game machines.

In this example, seats are provided for each of the wagering game machines. A seat 612 is positioned in front of the wagering game machine 604. A seat 614 is positioned in front of the wagering game machine 606. A seat 616 is positioned in front of the wagering game machine 608. A wagering game player 618 is seated in the seat 612 in front of the wagering game machine 604. A wagering game player 620 is seated in the seat 614 in front of the wagering game machine 606. A wagering game player 622 is seated in the seat 616 in front of the wagering game machine 608.

Each wagering game machine includes a motion sensing controller. The wagering game machine 604 includes a motion sensing controller 630. The wagering game machine 606 includes a motion sensing controller 632. The wagering game machine 608 includes a motion sensing controller 634. The motion sensing controller 630 is communicatively coupled to the position module for the wagering game machine 604. The motion sensing controller 632 is communicatively coupled to the position module for the wagering game machine 606. The motion sensing controller 634 is communicatively coupled to the position module for the wagering game machine 608. In some example embodiments, each of the motion sensing controllers 630-634 include a wireless receiver for receiving wireless transmissions from the wireless emitters.

The motion sensing controllers 630-634 are positioned for calibration (similar to FIG. 1) and can be used for gameplay by the wagering game players (similar to FIG. 3). The motion sensing controller 630 is positioned on the side of the wagering game machine 604. The motion sensing controller 632 is positioned on the side of the wagering game machine 606. The motion sensing controller 634 is positioned on the side of the wagering game machine 608. For example, some type of holder, pouch, etc. can be attached to the wagering game machines such that the motion sensing controllers can be placed in these holders, pouches, etc. during calibration of the wagering game system 600 and when a communal wagering game play is not occurring.

The example of FIG. 6 includes a time when the wagering game system 600 is being calibrated. In this example, the motion sensing controllers 630-634 are positioned in their holders, pouches, etc. on the sides of the wagering game machines 604-608. In particular, the motion sensing controllers 630-634 are located at known fixed positioned during calibration. Also, calibration can be initiated in response to an input (remotely or locally) from an operator of the wagering game system 600. For example, the operator can perform an administrative login at one of the wagering game machines 604-608 and provide some input to initiate the calibration of the wagering game system 600.

FIG. 6 depicts a number of wireless transmissions being emitted, during calibration and gameplay, by wireless emitters and being received by the wireless receivers in the motion sensing controllers. These wireless transmissions can comprise magnetic fields. A wireless emitter 610 fixedly positioned on top of the display 602 emits a wireless transmission 640. The wireless emitter fixedly positioned emits a wireless transmission 642.

In this example, each receiver in a motion sensing controller receives and captures two different wireless transmissions. In particular, the receiver in the motion sensing controller 630 receives and captures the wireless transmission 640 from the wireless emitter 610 and the wireless transmission 642 from the wireless emitter 690. The receiver in the motion sensing controller 632 receives and captures the wireless transmission 640 from the wireless emitter 610 and the wireless transmission 644 from the wireless emitter 690. The receiver in the motion sensing controller 634 receives and captures the wireless transmission 640 from the wireless emitter 610 and the wireless transmission 642 from the wireless emitter 690. In some example embodiments, after capturing these calibration wireless transmissions, the receivers forward this data to the position module for further processing.

In some example embodiments, the emitters are three-axis electromagnetic sources that include three orthogonal antennas that output magnetic fields. In some example embodiments, the receivers are three-axis electromagnetic sensors that include three orthogonal antennas that receive the magnetic fields output from the emitters (see description of FIG. 2 above). While described as comprising three axes, in some other example embodiments, the electromagnetic sources and receivers can comprise a lesser or greater number of axes as long as sufficient data is available to the position module to calculate the required six different data values that represent the position and angle of each of the wireless emitters to the wireless receiver.

In some example embodiments, the position module in the wagering game machine receives the data representing the received magnetic fields and converts the analog signals into digital data. The position module can be any combination of software, hardware, and firmware that converts the analog signal to digital data. For example, the position module can include a time division multiplexer, an amplifier, a demodulator and a low pass filter that are used to convert the analog signals into digital data.

In this example for each motion sensing controller, the position module processes each of the two wireless transmissions (the analog signal) to produce six different data values that represent the position and angle of each of the wireless emitters to the wireless receiver: three linear measurements (X component, Y component, and Z component) and three angular measurements (X component, Y component, and Z component). See example in Table 1 above. The position module also determines a difference for each of the six measurements (see example in Table 2 above).

Similarly, a same or different position module can generate the six different measurements for the wireless transmissions received by the receivers in the motion sensing controllers. The position module can also determine a difference for each of the six measurements. If these are calibration wireless transmissions, these differences in measurements are stored as calibration measurements for each of the three motion sensing controllers.

As described above in reference to FIG. 3 if these are gameplay wireless transmissions, the position module can use values from one or both of the gameplay wireless transmissions to determine gameplay movement for a given motion sensing controller. In particular, based on these values, the wagering game module in the wagering game machine can update the movement of the cursor on the display (as described in reference to FIG. 3).

In some example embodiments, these values from the gameplay wireless transmissions can also be used to determine if there was movement of one or some of the stationary components of the wagering game system 600, interference or distortion of the gameplay wireless transmissions. The position module also determines a difference for each of the six measurements (see example in Table 4 above).

Similarly, a same or different position module can generate the six different measurements for the gameplay wireless transmissions received by the receivers for each of the motion sensing controllers. The position module can also determine a difference for each of the six measurements. These differences in measurements can be compared to the calibration measurements for each of the three motion sensing controllers (see example in Table 5 above).

If there were no distortion of the transmissions and/or no movement of the stationary components of the wagering game system 600, all six difference measurements would be 0 or no change. In some example embodiments, if any of these six difference measurements is nonzero or changed, then there is distortion and/or movement of the stationary components of the wagering game system 600. In some example embodiments, if one or more of the difference measurements are nonzero or changed but are below an acceptable threshold level, then the wagering game system 600 is still considered to not have distortion of the transmissions and no movement of the stationary components of the wagering game system 600. In some example embodiments, if two or more of these six difference measurements is nonzero or changed (and/or beyond the acceptable threshold level), then there is distortion and/or movement of the stationary components of the wagering game system 600. In some example embodiments, if all six difference measurements are nonzero or changed (and/or beyond the acceptable threshold level), then there is distortion and/or movement of the stationary components of the wagering game system 600.

The wagering game system 600 can perform one to a number of different operations in response to detection of movement of these stationary components, interference, distortion, etc. For example, a real time adjustment can be performed to correct for this movement, interference, distortion, etc. In another example, an alarm can be triggered to notify an operator of the wagering game establishment. The operator can recalibrate the wagering game system 600 to account for the stationary movement, interference, distortion, etc., can take the system temporary offline, etc. In some example embodiments, the response to this movement, distortion can be dependent on the number of difference measurements that are nonzero. For example, if the number of difference measurements is greater than three, then a recalibration is performed. In some example embodiments, the response is based on the difference measurements across multiple receiver/emitter combinations. For example, if two different receiver/emitter combinations have at least one nonzero difference measurement, the wagering game system 600 is taken offline. Also, this response can also be dependent on difference measurements across multiple wagering game systems. For example, if there are at least two difference measurements across any receiver/emitter combinations for a number of wagering game systems, the response can comprise an alarm and having the wagering game systems taken offline.

Figure 7:
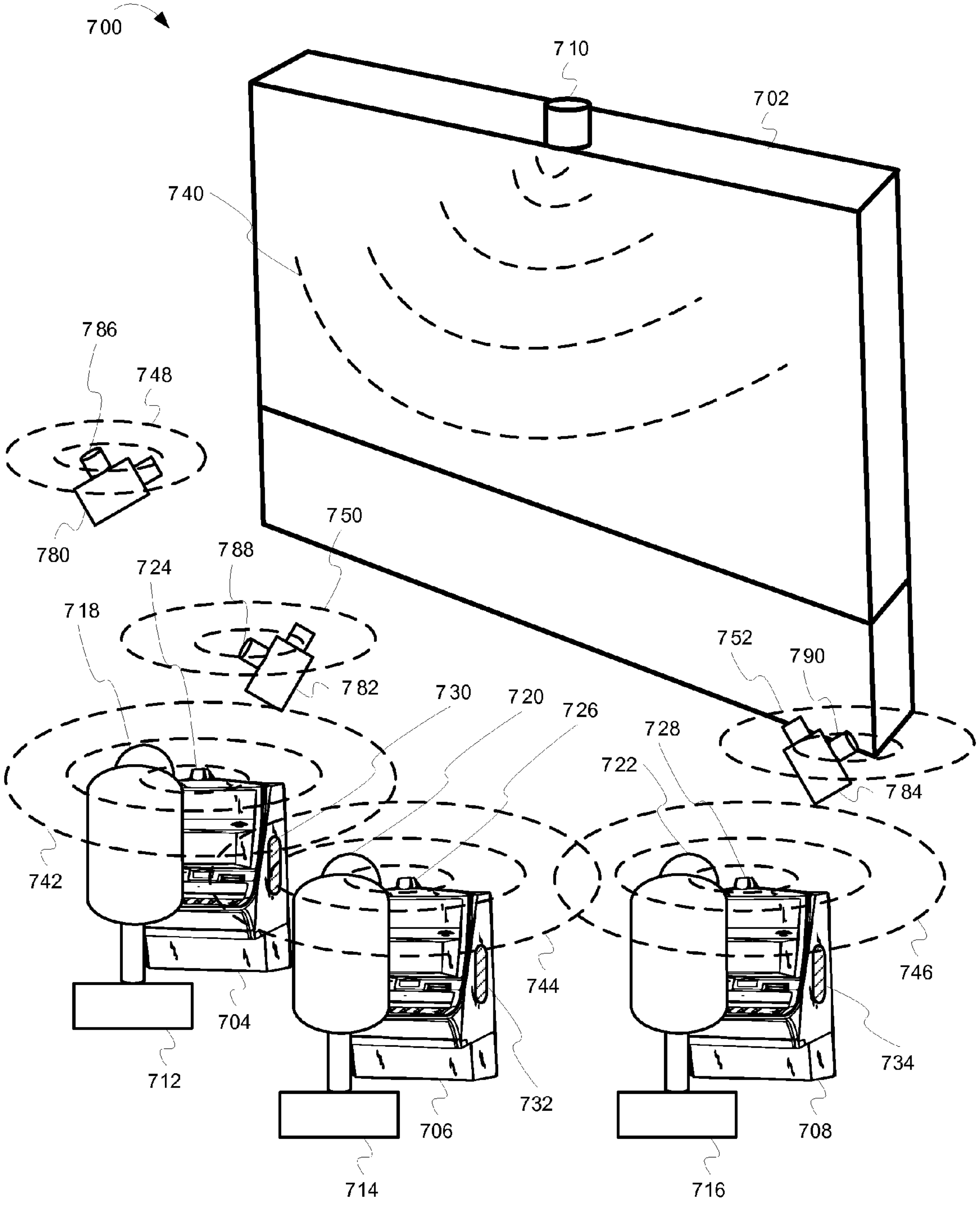
FIG. 7 depicts a wagering game system having motion sensing controllers and multiple wireless emitters, wherein wireless emitters are fixedly positioned on the display, the wagering game machines and the projectors providing the video output, according to some example embodiments.

FIG. 7 depicts a wagering game system having motion sensing controllers and multiple wireless emitters, wherein wireless emitters are fixedly positioned on the display, the wagering game machines and the projectors providing the video output, according to some example embodiments. In contrast to the wagering game system 100 illustrated in FIGS. 1 and 3, FIG. 7 depicts a wagering game system 700 wherein there are additional wireless emitters fixedly positioned to projectors that provide the visual output on the shared display. In this example, there are multiple projectors positioned above the wagering game machines. Other configurations can include other positions for the projectors and a lesser or greater number of projectors.

The wagering game system 700 that includes a display 702, a projector 786, a projector 788, a projector 790, a wagering game machine 704, a wagering game machine 706, and a wagering game machine 708. In some example embodiments, the projectors 786-790 display video outputs that combined together to provide a display of the communal wagering game play. Each of the wagering game machine 704, the wagering game machine 706, and the wagering game machine 708 can include a wagering game module that is executed to provide communal wagering game play that is playable by a wagering game player across the different wagering game machines 704-708. In some example embodiments, there is a position module within each wagering game machine that receives and processes the wireless transmissions received by the wireless receivers.

Also, the visual output from the communal wagering game play can be displayed on the display 702 by one or more of the projectors 780-784. Accordingly, the display 702, the projectors 780-784, and the wagering game machines 704-708 are communicatively coupled together. An example of a wagering game machine architecture having a wagering game module and a position module is illustrated in FIG. 12, which is described in more detail below. The wagering game system 700 also includes a wireless emitter 710 that is fixedly positioned to the display 702. In this example, there is a single wireless emitter fixedly positioned to the display 702. In some other example embodiments, the wireless emitter 710 can be positioned at any other location on or near the display 702 that can be used to determine movement of the display 602 (as further described below). Also in some other example embodiments, there can be multiple wireless emitters fixedly positioned on the display 702 (e.g., opposite corners, all four corners, top and bottom, left and right, etc.).

In this example, a wireless emitter is also fixedly positioned to each of the projectors 780-784. A wireless emitter 786 is fixedly positioned to the projector 780. A wireless emitter 788 is fixedly positioned to the projector 782. A wireless emitter 790 is fixedly positioned to the projector 784. In some example embodiments only one or less than all of the projectors 780-784 have a wireless emitter affixed thereto. A wireless emitter 724 is fixedly position on the wagering game machine 704. A wireless emitter 726 is fixedly positioned on the wagering game machine 706. A wireless emitter 728 is fixedly positioned on the wagering game machine 708.

In this example, seats are provided for each of the wagering game machines. A seat 712 is positioned in front of the wagering game machine 704. A seat 714 is positioned in front of the wagering game machine 706. A seat 716 is positioned in front of the wagering game machine 708. A wagering game player 718 is seated in the seat 712 in front of the wagering game machine 704. A wagering game player 720 is seated in the seat 714 in front of the wagering game machine 706. A wagering game player 722 is seated in the seat 716 in front of the wagering game machine 708.

Each wagering game machine includes a motion sensing controller. The wagering game machine 704 includes a motion sensing controller 730. The wagering game machine 706 includes a motion sensing controller 732. The wagering game machine 708 includes a motion sensing controller 634. The motion sensing controller 730 is communicatively coupled to the position module for the wagering game machine 704. The motion sensing controller 732 is communicatively coupled to the position module for the wagering game machine 706. The motion sensing controller 734 is communicatively coupled to the position module for the wagering game machine 708. In some example embodiments, each of the motion sensing controllers 730-734 include a wireless receiver for receiving wireless transmissions from the wireless emitters.

The motion sensing controllers 730-734 are positioned for calibration (similar to FIG. 1) and can be used for gameplay by the wagering game players (similar to FIG. 3). The motion sensing controller 730 is positioned on the side of the wagering game machine 704. The motion sensing controller 732 is positioned on the side of the wagering game machine 706. The motion sensing controller 734 is positioned on the side of the wagering game machine 708. For example, some type of holder, pouch, etc. can be attached to the wagering game machines such that the motion sensing controllers can be placed in these holders, pouches, etc. during calibration of the wagering game system 700 and when a communal wagering game play is not occurring.

The example of FIG. 7 includes a time when the wagering game system 700 is being calibrated. In this example, the motion sensing controllers 730-734 are positioned in their holders, pouches, etc. on the sides of the wagering game machines 704-708. In particular, the motion sensing controllers 730-734 are located at known fixed positioned during calibration. Also, calibration can be initiated in response to an input (remotely or locally) from an operator of the wagering game system 700. For example, the operator can perform an administrative login at one of the wagering game machines 704-708 and provide some input to initiate the calibration of the wagering game system 700.

FIG. 7 depicts a number of wireless transmissions being emitted, during calibration and gameplay, by wireless emitters and being received by the wireless receivers in the motion sensing controllers. These wireless transmissions can comprise magnetic fields. The wireless emitter 710 fixedly positioned on top of the display 702 emits a wireless transmission 640. The wireless emitter 786 fixedly positioned on the projector 780 emits a wireless transmission 748. The wireless emitter 788 fixedly positioned on the projector 782 emits a wireless transmission 750. The wireless emitter 790 fixedly positioned on the projector 784 emits a wireless transmission 752.

In this example, each receiver in a motion sensing controller receives and captures two or more different wireless transmissions. In particular, the receiver in the motion sensing controller 730 can receive and capture the wireless transmission 740 from the wireless emitter 710, the wireless transmission 742 from the wireless emitter 724, and the wireless transmission 748 from the wireless emitter 786. The receiver in the motion sensing controller 732 can receive and capture the wireless transmission 740 from the wireless emitter 710, the wireless transmission 744 from the wireless emitter 726, and the wireless transmission 750 from the wireless emitter 788. The receiver in the motion sensing controller 734 can receive and capture the wireless transmission 740 from the wireless emitter 710, the wireless transmission 746 from the wireless emitter 728, and the wireless transmission 752 from the wireless emitter 790. In some example embodiments, after capturing these calibration wireless transmissions, the receivers forward this data to the position module for further processing.

In some example embodiments, the emitters are three-axis electromagnetic sources that include three orthogonal antennas that output magnetic fields. In some example embodiments, the receivers are three-axis electromagnetic sensors that include three orthogonal antennas that receive the magnetic fields output from the emitters (see description of FIG. 2 above). While described as comprising three axes, in some other example embodiments, the electromagnetic sources and receivers can comprise a lesser or greater number of axes as long as sufficient data is available to the position module to calculate the required six different data values that represent the position and angle of each of the wireless emitters to the wireless receiver.

In some example embodiments, the position module in the wagering game machine receives the data representing the received magnetic fields and converts the analog signals into digital data. The position module can be any combination of software, hardware, and firmware that converts the analog signal to digital data. For example, the position module can include a time division multiplexer, an amplifier, a demodulator and a low pass filter that are used to convert the analog signals into digital data.

In this example for each motion sensing controller, the position module processes each of the three wireless transmissions (the analog signal) to produce six different data values that represent the position and angle of the wireless emitter to the wireless receiver: three linear measurements (X component, Y component, and Z component) and three angular measurements (X component, Y component, and Z component). See example in Table 1 above. The position module also determines a difference for each of the six measurements (see example in Table 2 above). In this example, the position module can determine multiple differences. For example with reference to the motion sensing controller 730, the position module can determine a difference of the six different data values for the wireless transmission 740 and the wireless transmission 748. Alternatively or in addition, the position module can determine a difference of the six different data values for the wireless transmission 740 and the wireless transmission 742. Alternatively or in addition, the position module can determine a difference of the six different data values for the wireless transmission 748 and the wireless transmission 742. Similarly, a same or different position module can generate the six different measurements for the wireless transmissions received by the receivers in all of the motion sensing controllers. The position module can also determine a difference for each of the six measurements. If these are calibration wireless transmissions, these differences in measurements are stored as calibration measurements for each of the three motion sensing controllers.

As described above in reference to FIG. 3 if these are gameplay wireless transmissions, the position module can use values from any or all three of the gameplay wireless transmissions to determine gameplay movement for a given motion sensing controller. In particular, based on these values, the wagering game module in the wagering game machine can update the movement of the cursor on the display (as described in reference to FIG. 3).

In some example embodiments, these values from the gameplay wireless transmissions can also be used to determine if there was movement of one or some of the stationary components of the wagering game system 700, interference or distortion of the gameplay wireless transmissions. The position module also determines a difference for each of the six measurements (see example in Table 4 above).

Similarly, a same or different position module can generate the six different measurements for the gameplay wireless transmissions received by the receivers for each of the motion sensing controllers. The position module can also determine a difference for each of the six measurements. These differences in measurements can be compared to the calibration measurements for each of the three motion sensing controllers (see example in Table 5 above).

If there were no distortion of the transmissions and/or no movement of the stationary components of the wagering game system 700, all six difference measurements would be 0 or no change. In some example embodiments, if any of these six difference measurements is nonzero or changed, then there is distortion and/or movement of the stationary components of the wagering game system 700. In some example embodiments, if one or more of the difference measurements are nonzero or changed but are below an acceptable threshold level, then the wagering game system 700 is still considered to not have distortion of the transmissions and no movement of the stationary components of the wagering game system 700. In some example embodiments, if two or more of these six difference measurements is nonzero or changed (and/or beyond the acceptable threshold level), then there is distortion and/or movement of the stationary components of the wagering game system 700. In some example embodiments, if all six difference measurements are nonzero or changed (and/or beyond the acceptable threshold level), then there is distortion and/or movement of the stationary components of the wagering game system 700.

The wagering game system 700 can perform one to a number of different operations in response to detection of movement of these stationary components, interference, distortion, etc. For example, a real time adjustment can be performed to correct for this movement, interference, distortion, etc. In another example, an alarm can be triggered to notify an operator of the wagering game establishment. The operator can recalibrate the wagering game system 700 to account for the stationary movement, interference, distortion, etc., can take the system temporary offline, etc. In some example embodiments, the response to this movement, distortion can be dependent on the number of difference measurements that are nonzero. For example, if the number of difference measurements is greater than three, then a recalibration is performed. In some example embodiments, the response is based on the difference measurements across multiple receiver/emitter combinations. For example, if two different receiver/emitter combinations have at least one nonzero difference measurement, the wagering game system 700 is taken offline. Also, this response can also be dependent on difference measurements across multiple wagering game systems. For example, if there are at least two difference measurements across any receiver/emitter combinations for a number of wagering game systems, the response can comprise an alarm and having the wagering game systems taken offline.

Some example embodiments include other systems in addition to those illustrated in FIGS. 1, 3, and 5-7 or variants thereof. For example, with reference to FIG. 6, the shared wireless emitter 690 can be moved to a fixed position on a single wagering game machine that is shared among all of the wagering game machines. In another example, with reference to FIG. 6, the emitters and receivers can be switched. In particular, the motion sensing controllers can include the wireless emitters and the receivers can be located on the shared display and the central location. In some other example embodiments, with reference to FIG. 7, the emitters and receivers can be switched.

Example Operations

This section describes operations associated with some example embodiments. In the discussion below, the flow charts will be described with reference to the block diagrams presented above. However, in some example embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 8:
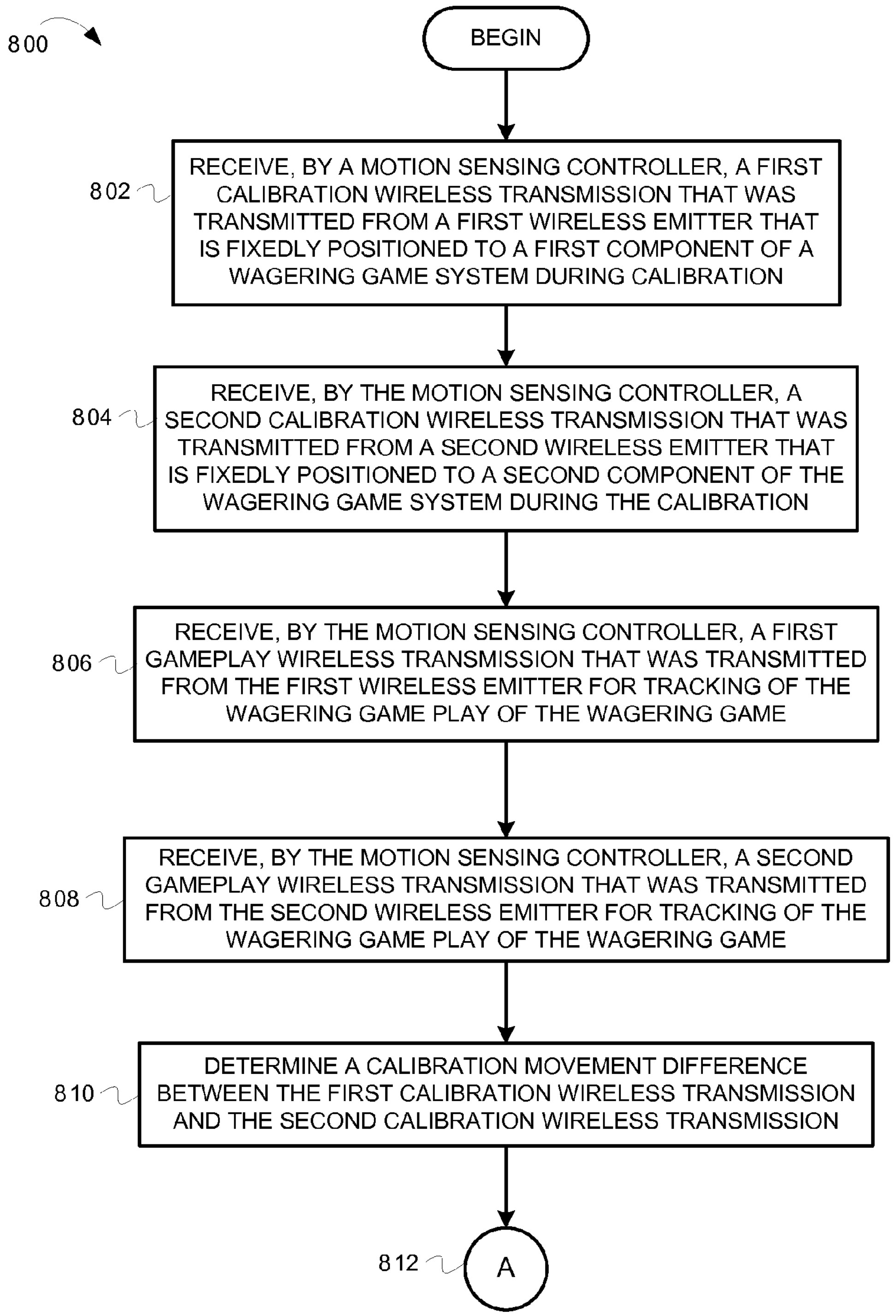
FIGS. 8-9 depict flowcharts for operations for calibration of a wagering game system having motion sensing controllers that include a wireless receiver, according to some example embodiments.
Figure 9:
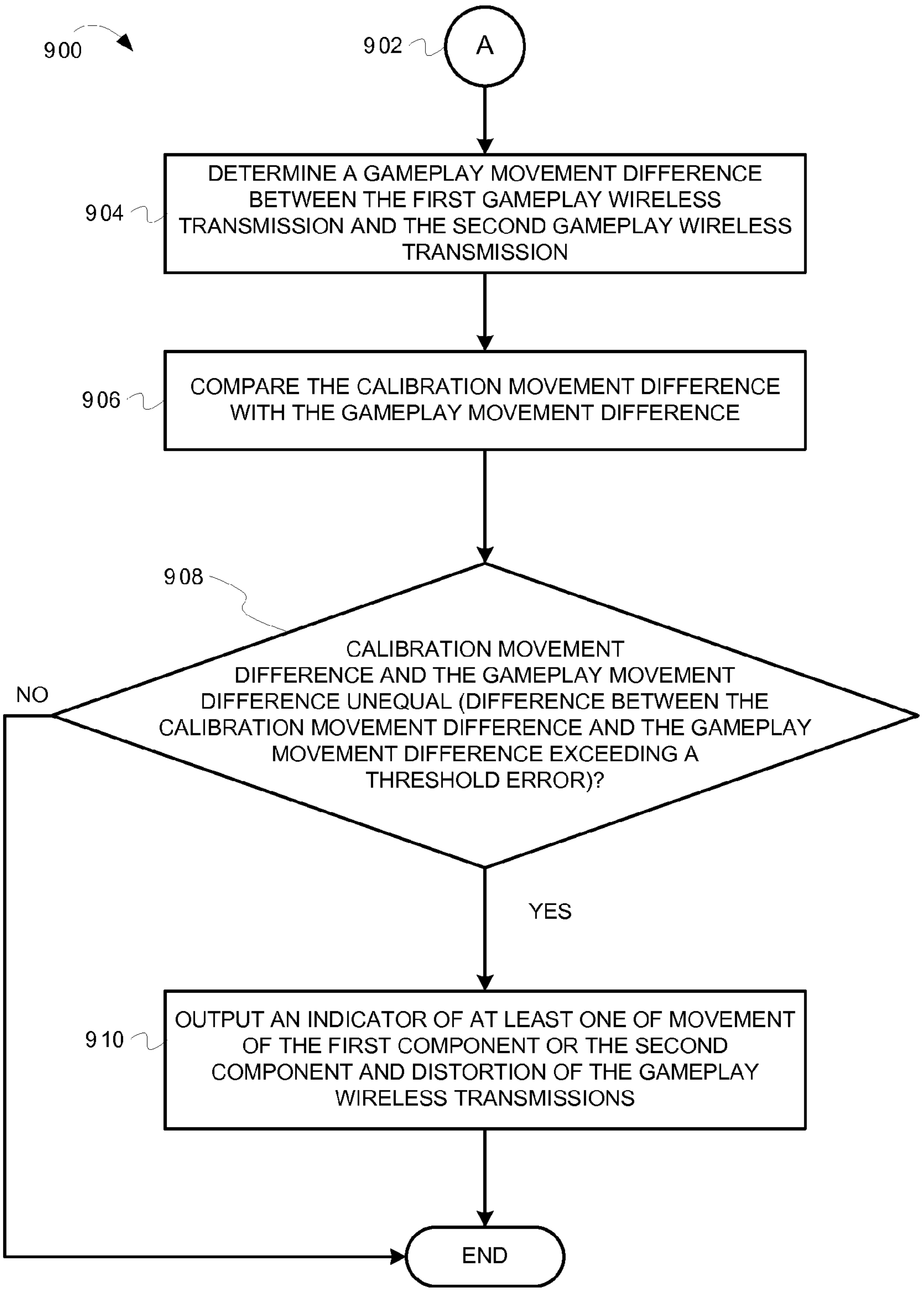
Figure 10:
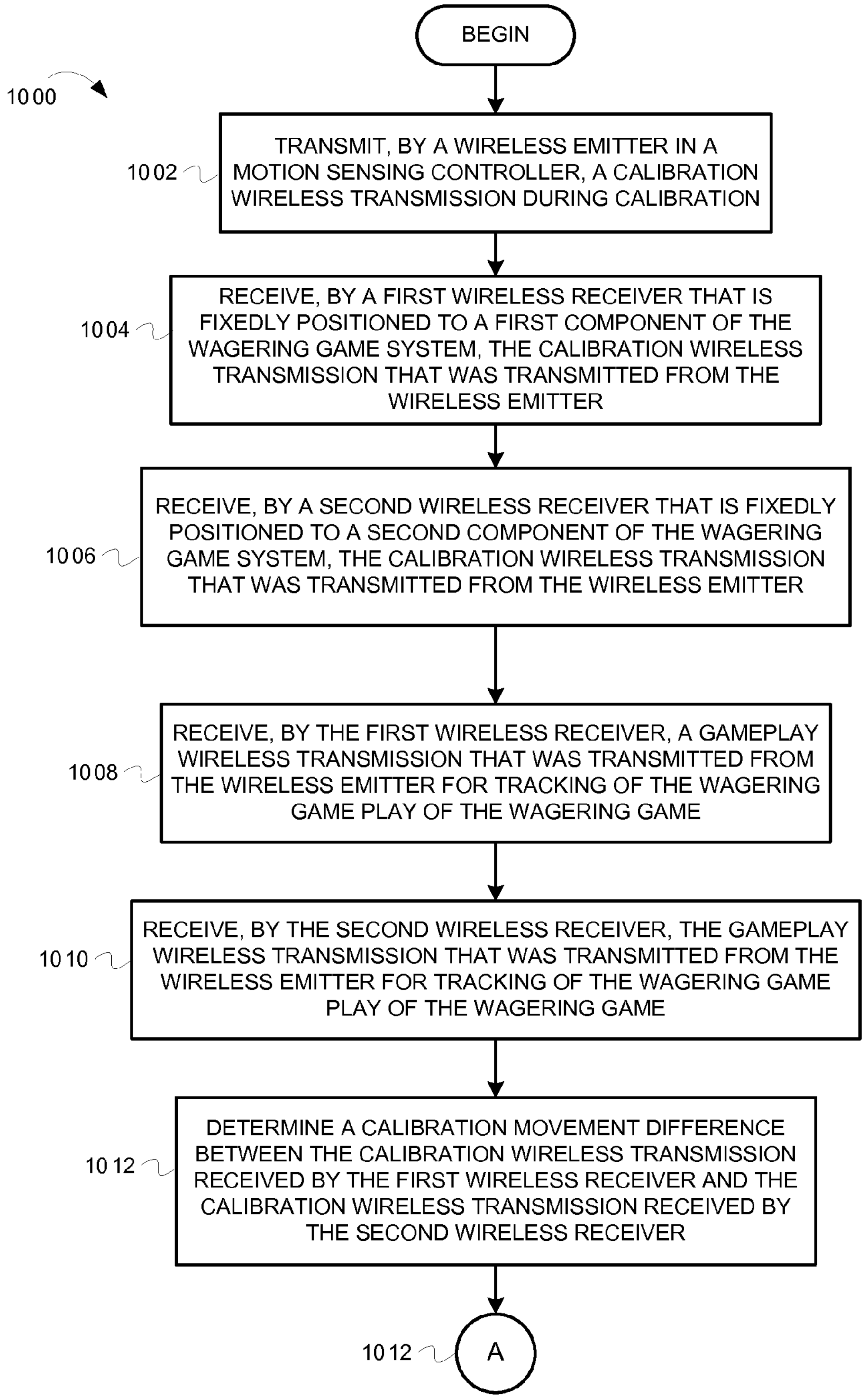
FIGS. 10-11 depict flowcharts for operations for calibration of a wagering game system having motion sensing controllers that include a wireless emitter, according to some example embodiments.
Figure 11:
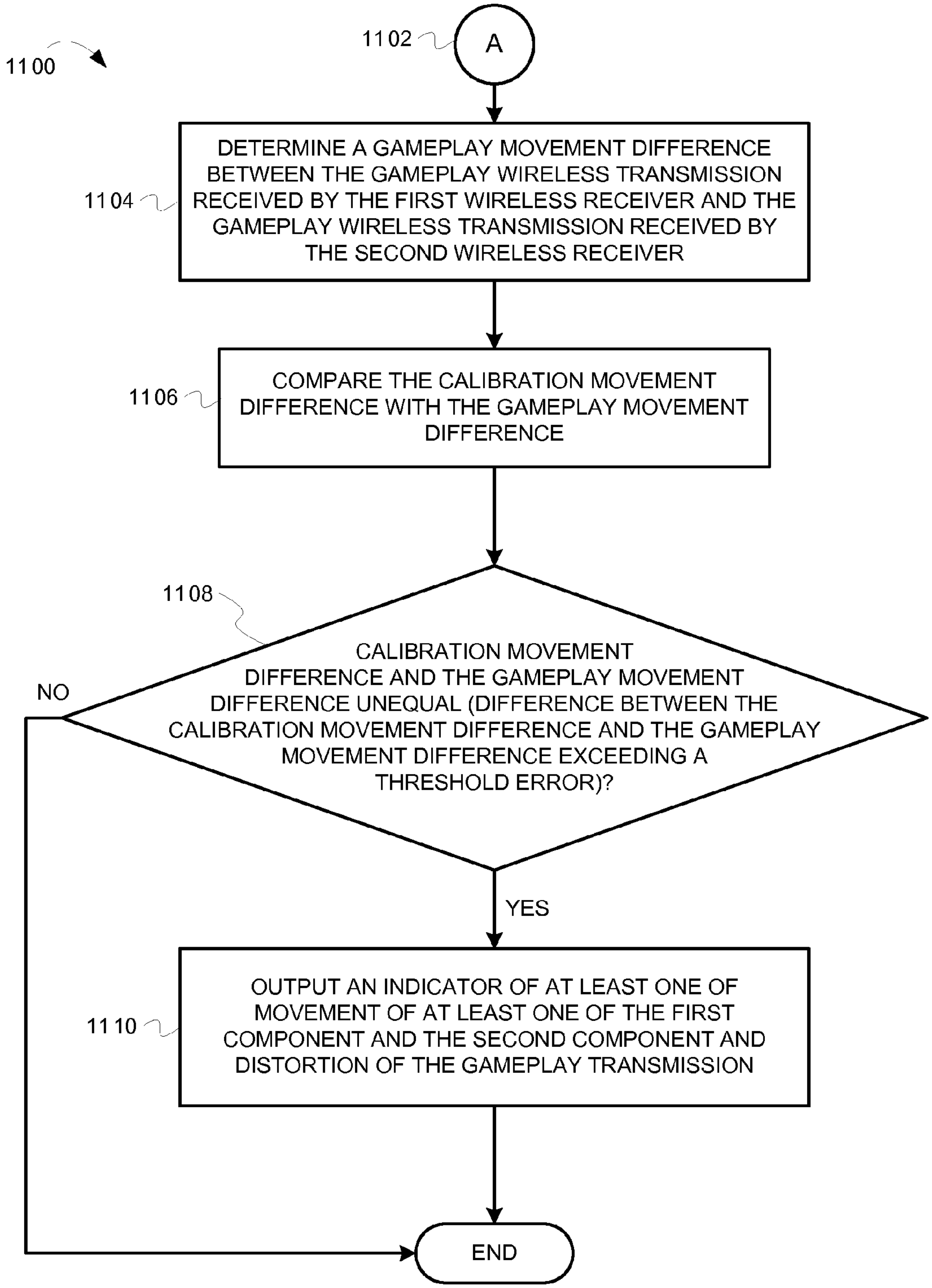

The section will discuss FIGS. 8-11. The discussion of FIGS. 8-11 will describe operations for using motion sensing controllers in a wagering game system. The two flowcharts of FIGS. 8-9 will describe operations performed for calibration of a wagering game system having motion sensing controllers, wherein the motion sensing controllers include a wireless receiver to receive wireless transmissions for calibration from multiple wireless emitters that are fixedly positioned. The flowchart of FIG. 9 is a continuation of the flowchart of FIG. 8. The two flowcharts of FIGS. 10-11 will describe operations performed for calibration of a wagering game system having motion sensing controllers, wherein the motion sensing controllers include a wireless emitter to transmit wireless transmissions for calibration that are received by multiple wireless emitters that are fixedly positioned. The flowchart of FIG. 11 is a continuation of the flowchart of FIG. 10.

FIGS. 8-9 depict flowcharts for operations for calibration of a wagering game system having motion sensing controllers that include a wireless receiver, according to some example embodiments. The operations of a flowchart 800 and 900 are described in reference to FIGS. 1 and 3. In some example embodiments, the operations are performed by the different components of the wagering game system 100 of FIGS. 1 and 3. The operations of the flowchart 800 are first described and followed by a description of the operations of the flowchart 900 (which are a continuation of the operations of the flowchart 800). The operations of the flowchart 800 begin at block 802.

At block 802, a motion sensing controller receives a first calibration wireless transmission that was transmitted from a first wireless emitter that is fixedly positioned to a first component of a wagering game system during calibration. For example with reference to FIG. 1, the wireless receiver in the motion sensing controller 130 receives the calibration wireless transmission 140 from the wireless transmitter 110. The operations of the flowchart 800 continue at block 804.

At block 804, the motion sensing controller receives a second calibration wireless transmission that was transmitted from a second wireless emitter that is fixedly positioned to a second component of the wagering game system during the calibration. For example with reference to FIG. 1, the wireless receiver in the motion sensing controller 130 receives the calibration wireless transmission 142 from the wireless transmitter 124. Operations of the flowchart 800 continue at block 806.

At block 806, the motion sensing controller receives a first gameplay wireless transmission that was transmitted from the first wireless emitter for tracking of the wagering game play of the wagering game. For example with reference to FIG. 3, the wireless receiver in the motion sensing controller 130 receives the gameplay wireless transmission 340 from the wireless transmitter 110. Operations of the flowchart 800 continue at block 808.

At block 808, the motion sensing controller receives a second gameplay wireless transmission that was transmitted from the second wireless emitter for tracking of the wagering game play of the wagering game. For example with reference to FIG. 3, the wireless receiver in the motion sensing controller 130 receives the gameplay wireless transmission 342 from the wireless transmitter 124. Operations of the flowchart 800 continue at block 808.

At block 810, the position module determines a calibration movement difference between the first calibration wireless transmission and the second calibration wireless transmission. With reference to Table 2 described above in reference to FIG. 1, the position module that can be executing in the wagering game machine 104 determines the calibration movement difference. Operations of the flowchart 800 continue at continuation point A 812, which continues at continuation point A 902 of the flowchart 900, which is now described.

From continuation point A 902, operations of the flowchart 900 start at block 904. At block 904, the position module determines a gameplay movement difference between the first gameplay wireless transmission and the second gameplay wireless transmission. With reference to Table 4 described above in reference to FIG. 3, the position module that can be executing in the wagering game machine 104 determines the gameplay movement difference. Operations of the flowchart 900 continue at block 906.

At block 906, the position module compares the calibration movement difference with the gameplay movement difference. With reference to FIGS. 1 and 3, the position module that can be executing in the wagering game machine 104 performs this comparison. Operations of the flowchart 900 continue at block 908.

At block 908, the position module determines whether calibration movement difference and the gameplay movement difference are unequal. Alternatively, the position module can determine whether the difference between the calibration movement difference and the gameplay movement difference exceeding a threshold error. If the differences are not equal or exceed the threshold error, operations of the flowchart 900 continue at block 910. Otherwise, operations of the flowchart are complete.

At block 910, the position module outputs an indicator of at least one of movement of a stationary component and distortion of the gameplay wireless transmissions. In response to this indication, the wagering game system 100 can perform one to a number of different operations in response to detection of movement of these stationary components, interference, distortion, etc. For example, a real time adjustment can be performed to correct for this movement, interference, distortion, etc. In another example, an alarm can be triggered to notify an operator of the wagering game establishment. The operator can recalibrate the wagering game system to account for the stationary movement, interference, distortion, etc., can take the system temporary offline, etc. Operations of the flowchart 900 are complete.

FIGS. 10-11 depict flowcharts for operations for calibration of a wagering game system having motion sensing controllers that include a wireless emitter, according to some example embodiments. The operations of a flowchart 1000 and 1100 are described in reference to FIG. 5. In some example embodiments, the operations are performed by the different components of the wagering game system 500 of FIG. 5. The operations of the flowchart 1000 are first described and followed by a description of the operations of the flowchart 1100 (which are a continuation of the operations of the flowchart 1000). The operations of the flowchart 1000 begin at block 1002.

At block 1002, a wireless emitter in a motion sensing controller transmits a calibration wireless transmission during calibration of the wagering game system. For example with reference to FIG. 5, the wireless emitter in the motion sensing controller 530 transmits the wireless transmission 542 emitted during calibration of the wagering game system 500. Operations of the flowchart 1000 continue at block 1004.

At block 1004, a first wireless receiver that is fixedly positioned to a first component of the wagering game system receives the calibration wireless transmission that was transmitted from the wireless emitter. For example with reference to FIG. 5, the wireless emitter 524 that is fixedly positioned to the wagering game machine 504 receives the wireless transmission 542 emitted during calibration. Operations of the flowchart 1000 continue at block 1006.

At block 1006, a second wireless receiver that is fixedly positioned to a second component of the wagering game system receives the calibration wireless transmission that was transmitted from the wireless emitter. For example with reference to FIG. 5, the wireless emitter 510 that is fixedly positioned to the display 502 receives the wireless transmission 542 emitted during calibration. Operations of the flowchart 1000 continue at block 1008.

At block 1008, the first wireless receiver that is fixedly positioned to the first component of the wagering game system receives a gameplay wireless transmission that was transmitted from the wireless emitter for tracking of the wagering game play of the wagering game. For example with reference to FIG. 5, the wireless emitter 524 receives the wireless transmission 542 emitted during gameplay. Operations of the flowchart 1000 continue at block 1010.

At block 1010, the second wireless receiver that is fixedly positioned to the second component of the wagering game system receives the gameplay wireless transmission that was transmitted from the wireless emitter for tracking of the wagering game play of the wagering game. For example with reference to FIG. 5, the wireless emitter 510 receives the wireless transmission 542 emitted during gameplay. Operations of the flowchart 1000 continue at block 1012.

At block 1012, the position module determines a calibration movement difference between the calibration wireless transmission received by the first wireless receiver and the calibration wireless transmission received by the second wireless receiver. With reference to Table 2 described above in reference to FIG. 1, the position module that can be executing in the wagering game machine 504 determines the calibration movement difference. Operations of the flowchart 1000 continue at continuation point A 1012, which continues at continuation point A 1102 of the flowchart 1100, which is now described.

From continuation point A 1102, operations of the flowchart 1100 start at block 1104. At block 1104, the position module determines a gameplay movement difference between the gameplay wireless transmission received by the first wireless receiver and the gameplay wireless transmission received by the second wireless receiver. With reference to Table 4 described above in reference to FIG. 3, the position module that can be executing in the wagering game machine 504 determines the gameplay movement difference. Operations of the flowchart 1100 continue at block 1106.

At block 1106, the position module compares the calibration movement difference with the gameplay movement difference. With reference to FIG. 5, the position module that can be executing in the wagering game machine 504 performs this comparison. Operations of the flowchart 1100 continue at block 1108.

At block 1108, the position module determines whether calibration movement difference and the gameplay movement difference are unequal. Alternatively, the position module can determine whether the difference between the calibration movement difference and the gameplay movement difference exceeding a threshold error. If the differences are not equal or exceed the threshold error, operations of the flowchart 1100 continue at block 1110. Otherwise, operations of the flowchart are complete.

At block 1110, the position module outputs an indicator of at least one of movement of a stationary component and distortion of the gameplay wireless transmissions. In response to this indication, the wagering game system 500 can perform one to a number of different operations in response to detection of movement of these stationary components, interference, distortion, etc. For example, a real time adjustment can be performed to correct for this movement, interference, distortion, etc. In another example, an alarm can be triggered to notify an operator of the wagering game establishment. The operator can recalibrate the wagering game system to account for the stationary movement, interference, distortion, etc., can take the system temporary offline, etc. Operations of the flowchart 1100 are complete.

Wagering Game Machine Architecture and Network Environment

This section describes an example wagering game architecture and network environment of some example embodiments.

Wagering Game Machine Architecture

FIG. 12 is a block diagram illustrating a wagering game machine architecture, according to some example embodiments. As shown in FIG. 12, the wagering game machine architecture 1200 includes a wagering game machine 1206, which includes a central processing unit (CPU) 1226 connected to main memory 1228. The CPU 1226 can include any suitable processor, such as an Intel® Pentium processor, Intel® Core 2 Duo processor, AMD Opteron™ processor, or UltraSPARC processor. The main memory 1228 includes a wagering game unit 1232 and a position module 1236. In one embodiment, the wagering game module 1232 can present wagering games, such as video poker, video black jack, video slots, video lottery, etc., in whole or part. In some example embodiments, the position module 1236 can receive and process the wireless transmissions, as described above.

The CPU 1226 is also connected to an input/output (I/O) bus 1222, which can include any suitable bus technologies, such as an AGTL+ frontside bus and a PCI backside bus. The I/O bus 1222 is connected to a payout mechanism 1208, primary display 1210, secondary display 1212, value input device 1214, player input device 1216, information reader 1218, and storage unit 1230. The player input device 1216 can include the value input device 1214 to the extent the player input device 1216 is used to place wagers. The I/O bus 1222 is also connected to an external system interface 1224, which is connected to external systems 1204 (e.g., wagering game networks).

In one embodiment, the wagering game machine 1206 can include additional peripheral devices and/or more than one of each component shown in FIG. 12. For example, in one embodiment, the wagering game machine 1206 can include multiple external system interfaces 1224 and/or multiple CPUs 1226. In one embodiment, any of the components can be integrated or subdivided.

Any component of the architecture 1200 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Figure 13:
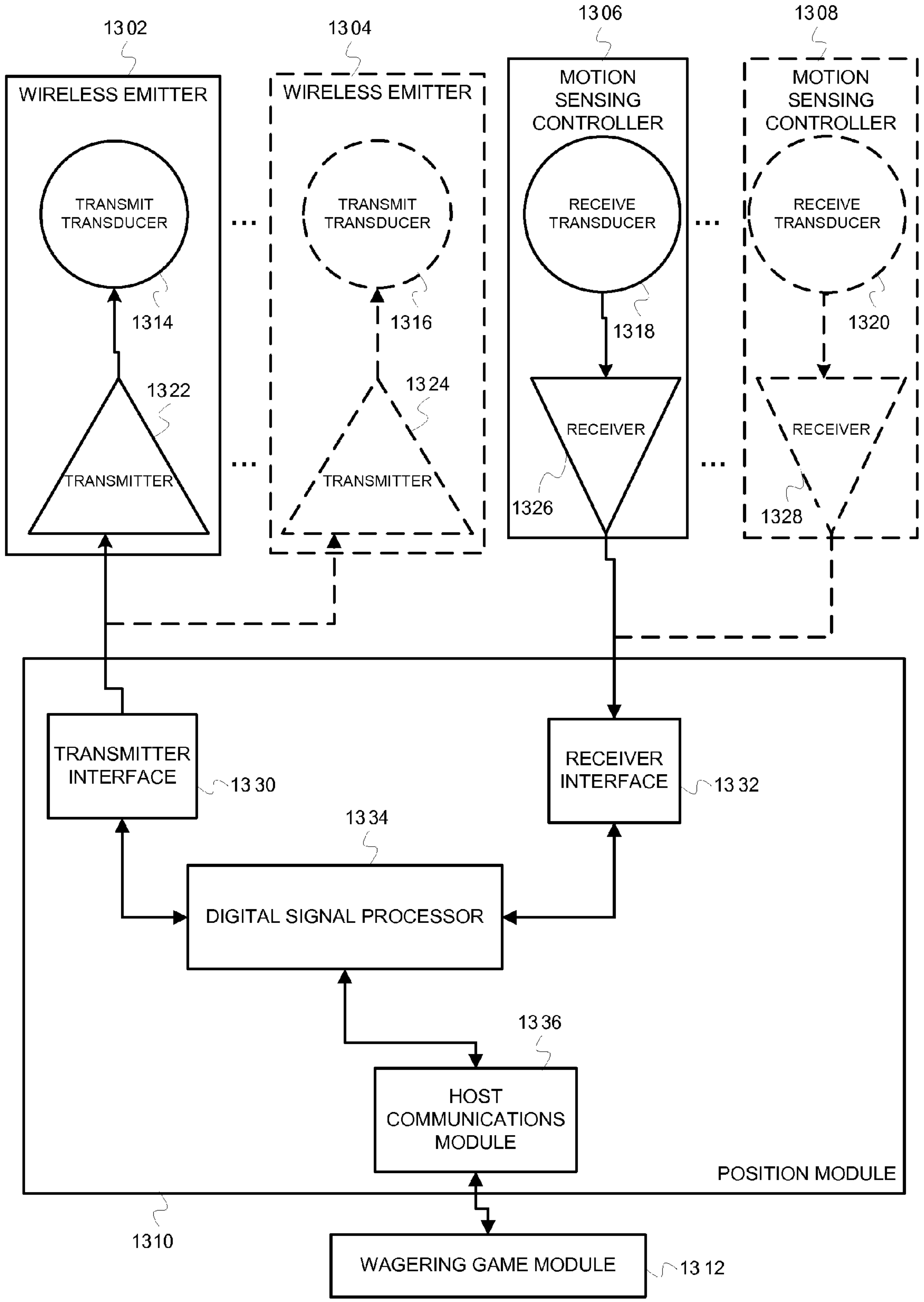
FIG. 13 depicts a more detailed block diagram of parts of the motion sensing controllers and the position module, according to some example embodiments.

FIG. 13 depicts a more detailed block diagram of parts of the motion sensing controllers and the position module, according to some example embodiments. FIG. 13 depicts an example configuration of the coupling of the motion sensing controllers, wireless emitters, the position module and the wagering game module. FIG. 13 includes a number of wireless emitters (shown as wireless emitters 1302-1304) and a number of motion sensing controllers (shown as motion sensing controllers 1306-1308). FIG. 13 also includes a position module 1310 and a wagering game module 1312.

The wireless emitter 1302 includes a transmit transducer 1314 and a transmitter 1322 that are communicatively coupled together. The wireless emitter 1304 includes a transmit transducer 1316 and a transmitter 1324 that are communicatively coupled together. The motion sensing controller 1306 includes a receive transducer 1318 and a receiver 1326 that are communicatively coupled together. The motion sensing controller 1308 includes a receive transducer 1320 and a receiver 1328 that are communicatively coupled together.

The position module 1310 includes a transmitter interface 1330, a receiver interface 1332, a digital signal processor 1334, and a host communications module 1336. The transmitter interface 1330 and the receiver interface 1332 are communicatively coupled to the digital signal processor 1334. The position module 1310 also includes a host communications module 1336. The host communications module 1336 is communicatively coupled to the wagering game module 1312.

The position module 1310 can be located in any component in a wagering game system. For example, the position module 1310 can be in one of the wagering game machine, in each wagering game machine, in the display, etc. Also, in this example, the receive transducers are within the motion sensing controllers. However, as described above, the motion sensing controllers can transmit (instead of receive) the wireless transmissions. Accordingly, in such an example, the motion sensing controllers would include the transmit transducers and transmitters, and wireless receivers would replace the wireless emitters and include the receive transducers and receivers.

During operation, the digital signal processor 1334 performs analog-to-digital conversion and digital-to-analog conversion. For example, the receive transducers 1318-1320 can capture the wireless transmissions (as described above). The receive transducers 1318-1320 can transmit this analog data to the receivers 1326-1328. The receivers 1326-1328 can then transmit this analog data to the digital signal processor 1334 through the receiver interface 1332. The digital signal processor 1334 can then convert this analog data into digital data and then forward this digital data to the host communications module 1336. The digital signal processor 1334 can also determine cursor positions for gameplay; determine differences for calibration and gameplay transmissions; compare differences between calibration transmissions and gameplay transmissions; etc. (as described above). The host communications module 1336 can then forward this data to the wagering game module 1312.

Also, during operation, the wagering game module 1312 can provide data to the digital signal processor 1334 through the host communications module 1336. The digital signal processor 1334 can then convert this data into analog data that is forwarded to the transmitters 1322-324 through the transmitter interface 1330. The transmitters can forward this analog data to the transmit transducers 1314-1316 to cause the transmit transducers to emit the wireless transmissions (for both calibration and gameplay), as described above.

Wagering Game Network

Figure 14:
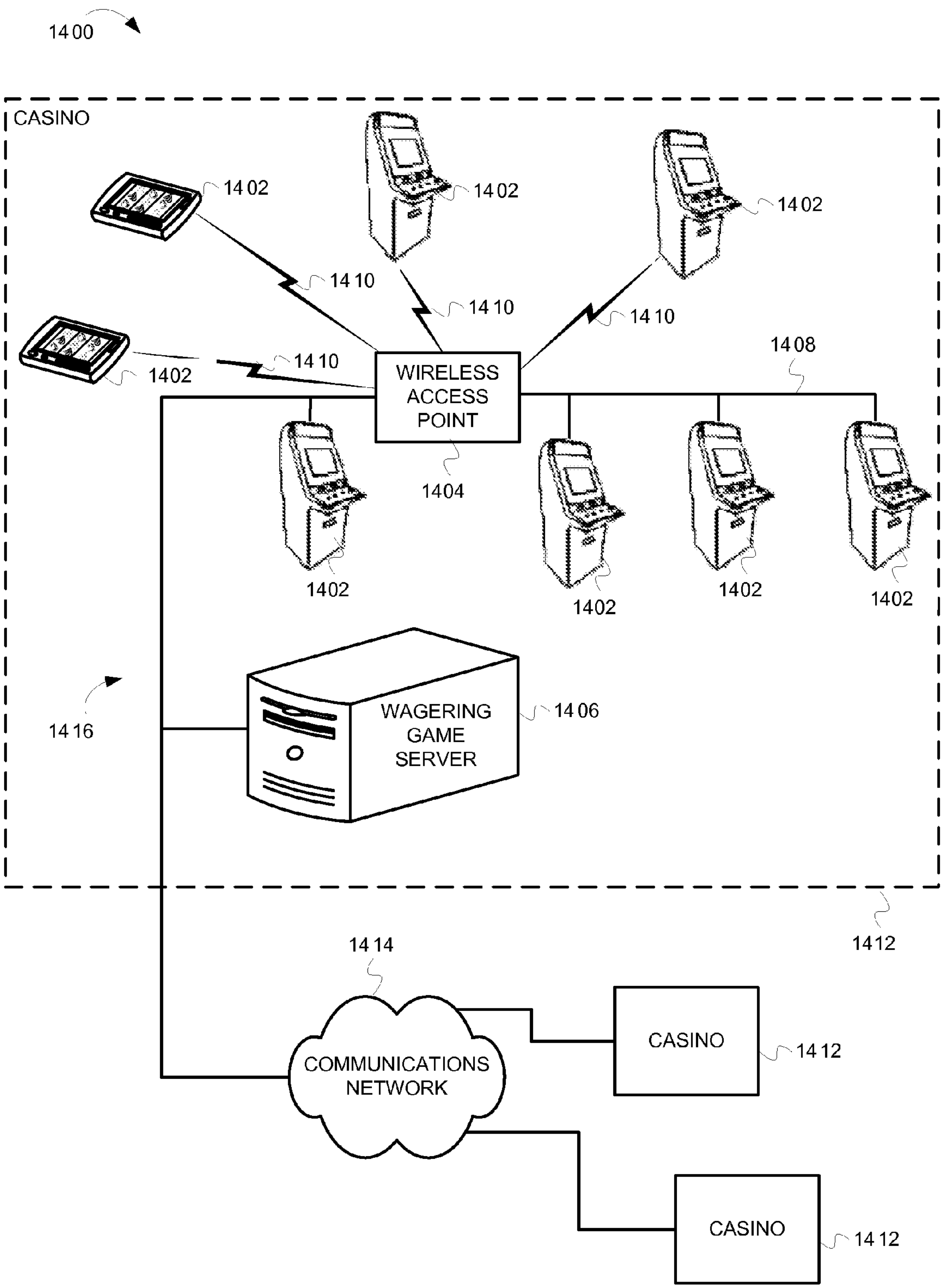
FIG. 14 is a block diagram illustrating a wagering game network, according to some example embodiments.

FIG. 14 is a block diagram illustrating a wagering game network 1400, according to some example embodiments. As shown in FIG. 14, the wagering game network 1400 includes a plurality of casinos 1412 connected to a communications network 1414.

Each casino 1412 includes a local area network 1416, which includes an access point 1404, a wagering game server 1406, and wagering game machines 1402. The access point 14304 provides wireless communication links 1410 and wired communication links 1408. The wired and wireless communication links can employ any suitable connection technology, such as Bluetooth, 802.11, Ethernet, public switched telephone networks, SONET, etc. In some embodiments, the wagering game server 1406 can serve wagering games and distribute content to devices located in other casinos 1412 or at other locations on the communications network 1414.

The wagering game machines 1402 described herein can take any suitable form, such as floor standing models, handheld mobile units, bartop models, workstation-type console models, etc. Further, the wagering game machines 1402 can be primarily dedicated for use in conducting wagering games, or can include non-dedicated devices, such as mobile phones, personal digital assistants, personal computers, etc. In one embodiment, the wagering game network 1400 can include other network devices, such as accounting servers, wide area progressive servers, player tracking servers, and/or other devices suitable for use in connection with embodiments of the invention.

In some embodiments, wagering game machines 1402 and wagering game servers 1406 work together such that a wagering game machine 1402 can be operated as a thin, thick, or intermediate client. For example, one or more elements of game play may be controlled by the wagering game machine 1402 (client) or the wagering game server 1406 (server). Game play elements can include executable game code, lookup tables, configuration files, game outcome, audio or visual representations of the game, game assets or the like. In a thin-client example, the wagering game server 1406 can perform functions such as determining game outcome or managing assets, while the wagering game machine 1402 can present a graphical representation of such outcome or asset modification to the user (e.g., player). In a thick-client example, the wagering game machines 1402 can determine game outcomes and communicate the outcomes to the wagering game server 1406 for recording or managing a player's account. In some example embodiments, the wagering game machines 1402 can have motion sensing controllers and can be part of communal wagering game play (as described above).

In some embodiments, either the wagering game machines 1402 (client) or the wagering game server 1406 can provide functionality that is not directly related to game play. For example, account transactions and account rules may be managed centrally (e.g., by the wagering game server 1406) or locally (e.g., by the wagering game machine 1402). Other functionality not directly related to game play may include power management, presentation of advertising, software or firmware updates, system quality or security checks, etc.

Any of the wagering game network components (e.g., the wagering game machines 1402) can include hardware and machine-readable media including instructions for performing the operations described herein.

Example Wagering Game Machine

Figure 15:
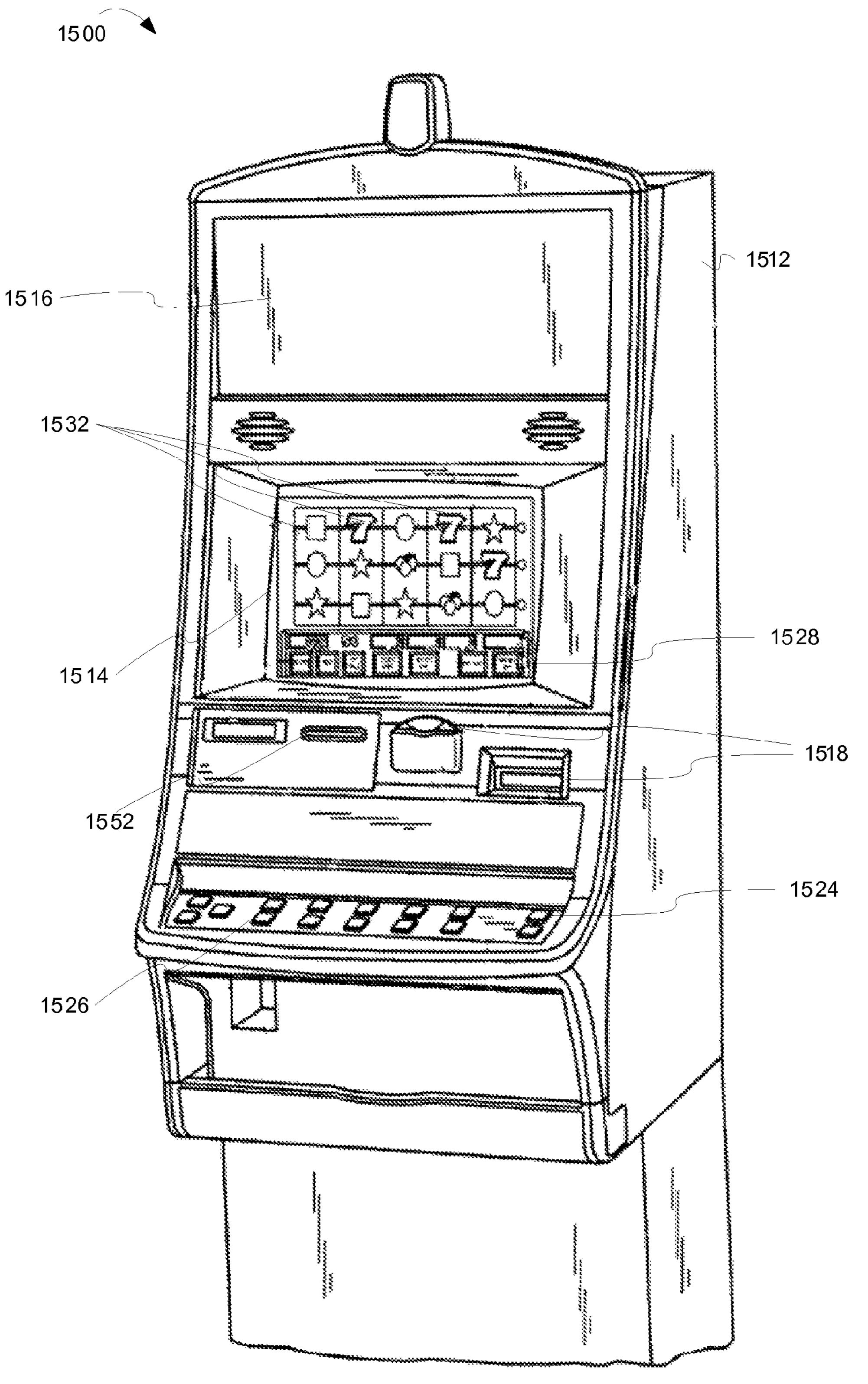
FIG. 15 is a perspective view of a wagering game machine, according to some example embodiments.

FIG. 15 is a perspective view of a wagering game machine, according to some example embodiments. Referring to FIG. 15, a wagering game machine 1500 is used in gaming establishments, such as casinos. According to embodiments, the wagering game machine 1500 can be any type of wagering game machine and can have varying structures and methods of operation. For example, the wagering game machine 1500 can be an electromechanical wagering game machine configured to play mechanical slots, or it can be an electronic wagering game machine configured to play video casino games, such as blackjack, slots, keno, poker, blackjack, roulette, etc.

The wagering game machine 1500 comprises a housing 1512 and includes input devices, including value input devices 1518 and a player input device 1524. For output, the wagering game machine 1500 includes a primary display 1515 for displaying information about a basic wagering game. The primary display 1515 can also display information about a bonus wagering game and a progressive wagering game. The wagering game machine 1500 also includes a secondary display 1516 for displaying wagering game events, wagering game outcomes, and/or signage information. While some components of the wagering game machine 1500 are described herein, numerous other elements can exist and can be used in any number or combination to create varying forms of the wagering game machine 1500.

The value input devices 1518 can take any suitable form and can be located on the front of the housing 1512. The value input devices 1518 can receive currency and/or credits inserted by a player. The value input devices 1518 can include coin acceptors for receiving coin currency and bill acceptors for receiving paper currency. Furthermore, the value input devices 1518 can include ticket readers or barcode scanners for reading information stored on vouchers, cards, or other tangible portable storage devices. The vouchers or cards can authorize access to central accounts, which can transfer money to the wagering game machine 1500.

The player input device 1524 comprises a plurality of push buttons on a button panel 1526 for operating the wagering game machine 1500. In addition, or alternatively, the player input device 1524 can comprise a touch screen 1528 mounted over the primary display 1514 and/or secondary display 1516.

The various components of the wagering game machine 1500 can be connected directly to, or contained within, the housing 1512. Alternatively, some of the wagering game machine's components can be located outside of the housing 1512, while being communicatively coupled with the wagering game machine 1500 using any suitable wired or wireless communication technology.

The operation of the basic wagering game can be displayed to the player on the primary display 1514. The primary display 1514 can also display a bonus game associated with the basic wagering game. The primary display 1514 can include a cathode ray tube (CRT), a high resolution liquid crystal display (LCD), a plasma display, light emitting diodes (LEDs), or any other type of display suitable for use in the wagering game machine 1500. Alternatively, the primary display 1514 can include a number of mechanical reels to display the outcome. In FIG. 15, the wagering game machine 1500 is an "upright" version in which the primary display 1514 is oriented vertically relative to the player. Alternatively, the wagering game machine can be a "slant-top" version in which the primary display 1514 is slanted at about a thirty-degree angle toward the player of the wagering game machine 1500. In yet another embodiment, the wagering game machine 1500 can exhibit any suitable form factor, such as a free standing model, bartop model, mobile handheld model, or workstation console model.

A player begins playing a basic wagering game by making a wager via the value input device 1518. The player can initiate play by using the player input device's buttons or touch screen 1528. The basic game can include arranging a plurality of symbols along a payline 1532, which indicates one or more outcomes of the basic game. Such outcomes can be randomly selected in response to player input. At least one of the outcomes, which can include any variation or combination of symbols, can trigger a bonus game.

In some embodiments, the wagering game machine 1500 can also include an information reader 1552, which can include a card reader, ticket reader, bar code scanner, RFID transceiver, or computer readable storage medium interface. In some embodiments, the information reader 1552 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

receiving, by a motion sensing controller, two calibration wireless transmissions that were transmitted from two different wireless emitters that are fixedly positioned to two different components of a wagering game system during calibration, wherein the motion sensing controller is configured to track wagering game play of a wagering game provided by a wagering game machine based on gesture recognition and pointing relative to a display configured to display the wagering game play;

receiving, by the motion sensing controller, two gameplay wireless transmissions that was transmitted from the two different wireless emitters for tracking of the wagering game play of the wagering game;

determining a calibration movement difference between the two calibration wireless transmissions;

determining a gameplay movement difference between the two gameplay wireless transmissions; and in response to at least one of the calibration movement difference and the gameplay movement difference being unequal and a difference between the calibration movement difference and the gameplay movement difference exceeding a threshold error, outputting an indicator of at least one of a component movement and distortion of one of the two different gameplay transmissions.

2. The method of claim 1, wherein a first calibration wireless transmission of the two different calibration wireless transmissions comprises data identifying three axes of position and three axes of rotation of the receiver relative to a first wireless emitter of the two different wireless emitters;

wherein a second calibration wireless transmission of the two different calibration wireless transmissions comprises data identifying three axes of position and three axes of rotation of the receiver relative to a second emitter of the two different wireless emitters;

wherein a first gameplay wireless transmission of the two different gameplay wireless transmissions comprises data identifying three axes of position and three axes of rotation of the receiver relative to first emitter; and wherein the second gameplay wireless transmission of the two different gameplay wireless transmissions comprises data identifying three axes of position and three axes of rotation of the receiver relative to the second emitter.

3. The method of claim 1, further comprising:

tracking movement of the motion sensing controller based on at least one of the two different gameplay wireless transmissions; and displaying a cursor on the display tracking the movement of the motion sensing controller.

4. The method of claim 3, wherein the tracking of the movement of the motion sensing controller comprises determining an absolute position of the motion sensing controller based on data identifying three axes of position and three axes of rotation of the receiver.

5. The method of claim 1, wherein the motion sensing controller is stationary during the calibration.

6. A method comprising:

transmitting, by a wireless emitter in a motion sensing controller, a calibration wireless transmission during calibration, wherein the motion sensing controller is associated with a wagering game machine of a wagering game system, the motion sensing controller configured to track wagering game play of a wagering game provided by the wagering game machine based on gesture recognition and pointing relative to a display configured to display the wagering game play;

receiving, by a first wireless receiver that is fixedly positioned to a first component of the wagering game system, the calibration wireless transmission that was transmitted from the wireless emitter, wherein the first component comprising at least one of, the wagering game machine;

the display; and a projector configured to project a video of the wagering game play on to the display;

receiving, by a second wireless receiver that is fixedly positioned to a second component of the wagering game system, the calibration wireless transmission that was transmitted from the wireless emitter, wherein the second component comprising at least one of, the wagering game machine;

the display; and the projector;

receiving, by the first wireless receiver, a gameplay wireless transmission that was transmitted from the wireless emitter for tracking of the wagering game play of the wagering game;

receiving, by the second wireless receiver, the gameplay wireless transmission that was transmitted from the wireless emitter for tracking of the wagering game play of the wagering game;

determining a calibration movement difference between the calibration wireless transmission received by the first wireless receiver and the calibration wireless transmission received by the second wireless receiver;

determining a gameplay movement difference between the gameplay wireless transmission received by the first wireless receiver and the gameplay wireless transmission received by the second wireless receiver;

comparing the calibration movement difference with the gameplay movement difference; and in response to at least one of the calibration movement difference and the gameplay movement difference being unequal and a difference between the calibration movement difference and the gameplay movement difference exceeding a threshold error, outputting an indicator of at least one of movement of at least one of the first component and the second component; and distortion of the gameplay transmission.

7. The method of claim 6, wherein the first calibration wireless transmission comprises data identifying three axes of position and three axes of rotation of the receiver relative to the wagering game machine emitter;

wherein the second calibration wireless transmission comprises data identifying three axes of position and three axes of rotation of the receiver relative to the display emitter;

wherein the first gameplay wireless transmission comprises data identifying three axes of position and three axes of rotation of the receiver relative to the wagering game machine emitter; and wherein the second gameplay wireless transmission comprises data identifying three axes of position and three axes of rotation of the receiver relative to the display emitter.

8. The method of claim 7, wherein the determining of the calibration movement difference comprises:

determining, for the first calibration wireless transmission and the second calibration wireless transmission, at least one of calibration position data in a direction along at least one of an X axis, a Y axis, and a Z axis; and calibration rotation data for at least one of the X axis, the Y axis, and the Z axis;

determining the calibration movement difference that is derived from on a difference between at least one of the calibration position data and the calibration rotation data for the first calibration wireless transmission and the second calibration wireless transmission;

wherein the determining of the gameplay movement difference comprises:

determining, for the first gameplay wireless transmission and the second gameplay wireless transmission, at least one of gameplay position data in a direction along at least one of an X axis, a Y axis, and a Z axis; and gameplay rotation data for at least one of the X axis, the Y axis, and the Z axis;

determining the gameplay movement difference that is derived from on a difference between at least one of the gameplay position data and the gameplay rotation data for the first gameplay wireless transmission and the second gameplay wireless transmission.

9. A system comprising:

at least two or more wagering game machines that are communicatively coupled together and configured to provide a communal wagering game across the at least two or more wagering game machines, wherein a wagering game machine emitter is fixedly positioned near each of the at least two or more wagering game machines, the wagering game machine emitter configured to transmit a first calibration wireless transmission during calibration, wherein the wagering game machine emitter is configured to transmit a first gameplay wireless transmission during play of the communal wagering game;

a display configured to display the communal wagering game, wherein the display is positioned in front of the at least two or more wagering game machines;

a display emitter fixedly positioned near the display, the display emitter configured to transmit a second calibration wireless transmission during the calibration, wherein the display emitter is configured to transmit a second gameplay wireless transmission during play of the communal wagering game;

a motion sensing controller associated with each of the at least two or more wagering game machines, wherein the motion sensing controller is configured to track wagering game play of the communal wagering game based on gesture recognition and pointing relative to the display, wherein the motion sensing controller comprises a receiver configured to capture the first calibration wireless transmission, the second calibration wireless transmission, the first gameplay wireless transmission, and the second gameplay wireless transmission; and a position module configured to, receive the first calibration wireless transmission from the wagering game machine emitter and the second calibration wireless transmission from the display emitter;

receive the first gameplay wireless transmission from the wagering game machine and the second gameplay wireless transmission from the display emitter;

determine a calibration movement difference between the first calibration wireless transmission and the second calibration wireless transmission;

determine a gameplay movement difference between the first gameplay wireless transmission and the second gameplay wireless transmission;

compare the calibration movement difference with the gameplay movement difference; and in response to at least one of the calibration movement difference and the gameplay movement difference being unequal and a difference between the calibration movement difference and the gameplay movement different exceeding a threshold error, output an indicator of movement of at least one of the display and one of the at least two wagering game machines.

10. The system of claim 9, wherein the first calibration wireless transmission comprises data identifying three axes of position and three axes of rotation of the receiver relative to the wagering game machine emitter;

wherein the second calibration wireless transmission comprises data identifying three axes of position and three axes of rotation of the receiver relative to the display emitter;

wherein the first gameplay wireless transmission comprises data identifying three axes of position and three axes of rotation of the receiver relative to the wagering game machine emitter; and wherein the second gameplay wireless transmission comprises data identifying three axes of position and three axes of rotation of the receiver relative to the display emitter.

11. The system of claim 10, wherein, as part of determination of the calibration movement difference, the position module is configured to, determine, for the first calibration wireless transmission, first calibration X position data in a direction along an X axis of the three axes of position;

determine, for the first calibration wireless transmission, first calibration Y position data in a direction along a Y axis of the three axes of position;

determine, for the first calibration wireless transmission, first calibration Z position data in a direction along a Z axis of the three axes of position;

determine, for the first calibration wireless transmission, first X rotation data for the X axis of the three axes of rotation;

determine, for the first calibration wireless transmission, first calibration Y rotation data for the Y axis of the three axes of rotation;

determine, for the first calibration wireless transmission, first calibration Z rotation data for the Z axis of the three axes of rotation;

determine, for the second calibration wireless transmission, second calibration X position data in a direction along an X axis of the three axes of position;

determine, for the second calibration wireless transmission, second calibration Y position data in a direction along a Y axis of the three axes of position;

determine, for the second calibration wireless transmission, second calibration Z position data in a direction along a Z axis of the three axes of position;

determine, for the second calibration wireless transmission, second calibration X rotation data for the X axis of the three axes of rotation;

determine, for the second calibration wireless transmission, second calibration Y rotation data for the Y axis of the three axes of rotation;

determine, for the second calibration wireless transmission, second calibration Z rotation data for the Z axis of the three axes of rotation;

determine an X position calibration difference between the first calibration X position data and the second calibration X position data;

determine a Y position calibration difference between the first calibration Y position data and the second calibration Y position data;

determine a Z position calibration difference between the first calibration Z position data and the second calibration Z position data;

determine an X rotation calibration difference between the first calibration X rotation data and the second calibration X rotation data;

determine a Y rotation calibration difference between the first calibration Y rotation data and the second calibration Y rotation data; and determine a Z rotation calibration difference between the first calibration Z rotation data and the second calibration Z rotation data;

and wherein, as part of determination of the gameplay movement difference, the position module is configured to, determine, for the first gameplay wireless transmission, first gameplay X position data in a direction along an X axis of the three axes of position;

determine, for the first gameplay wireless transmission, first gameplay Y position data in a direction along a Y axis of the three axes of position;

determine, for the first gameplay wireless transmission, first gameplay Z position data in a direction along a Z axis of the three axes of position;

determine, for the first gameplay wireless transmission, first gameplay X rotation data for the X axis of the three axes of rotation;

determine, for the first gameplay wireless transmission, first gameplay Y rotation data for the Y axis of the three axes of rotation;

determine, for the first gameplay wireless transmission, first gameplay Z rotation data for the Z axis of the three axes of rotation;

determine, for the second gameplay wireless transmission, second gameplay X position data in a direction along an X axis of the three axes of position;

determine, for the second gameplay wireless transmission, second gameplay Y position data in a direction along a Y axis of the three axes of position;

determine, for the second gameplay wireless transmission, second gameplay Z position data in a direction along a Z axis of the three axes of position;

determine, for the second gameplay wireless transmission, second gameplay X rotation data for the X axis of the three axes of rotation;

determine, for the second gameplay wireless transmission, second gameplay Y rotation data for the Y axis of the three axes of rotation;

determine, for the second gameplay wireless transmission, second gameplay Z rotation data for the Z axis of the three axes of rotation;

determine an X position gameplay difference between the first gameplay X position data and the second calibration X position data;

determine a Y position gameplay difference between the first gameplay Y position data and the second calibration Y position data;

determine a Z position gameplay difference between the first gameplay Z position data and the second calibration Z position data;

determine an X rotation gameplay difference between the first gameplay X rotation data and the second calibration X rotation data;

determine a Y rotation gameplay difference between the first gameplay Y rotation data and the second calibration Y rotation data; and determine a Z rotation gameplay difference between the first gameplay Z rotation data and the second calibration Z rotation data.

12. The system of claim 11, wherein, as part of comparison of the calibration movement difference with the gameplay movement difference, the position module is configured to, compare the X position calibration difference to the X position gameplay difference;

compare the Y position calibration difference to the Y position gameplay difference;

compare the Z position calibration difference to the Z position gameplay difference;

compare the X rotation calibration difference to the X rotation gameplay difference;

compare the Y rotation calibration difference to the Y rotation gameplay difference; and compare the Z rotation calibration difference to the Z rotation gameplay difference.

13. The system of claim 12, wherein the calibration movement difference and the gameplay movement difference are unequal if at least one of the following is unequal:

the X position calibration difference and the X position gameplay difference;

the Y position calibration difference and the Y position gameplay difference;

the Z position calibration difference and the Z position gameplay difference;

the X rotation calibration difference and the X rotation gameplay difference;

the Y rotation calibration difference and the Y rotation gameplay difference; and the Z rotation calibration difference and the Z rotation gameplay difference.

14. The system of claim 13, wherein the calibration movement difference and the gameplay movement difference exceed a threshold error if a difference for at least one of the following exceeds a threshold:

the X position calibration difference and the X position gameplay difference;

the Y position calibration difference and the Y position gameplay difference;

the Z position calibration difference and the Z position gameplay difference;

the X rotation calibration difference and the X rotation gameplay difference;

the Y rotation calibration difference and the Y rotation gameplay difference; and the Z rotation calibration difference and the Z rotation gameplay difference.

15. The system of claim 9, wherein the position module is configured to determine a cursor movement for the communal wagering game play derived by movement of the motion sensing controller and based on at least one of the first gameplay wireless transmission and the second gameplay wireless transmission.

16. A wagering game machine comprising:

a processor;

a wagering game module, executable on the processor, configured to present a wagering game;

a motion sensing controller configured to track wagering game play of the wagering game based on gesture recognition and pointing relative to a display, wherein the motion sensing controller comprises a receiver configured to capture a first calibration wireless transmission that was transmitted from a first wireless emitter that is fixedly positioned to a first component during calibration, the first component comprising at least one of, the wagering game machine;

the display; and a projector configured to project a video of the wagering game play on to the display;

capture a second calibration wireless transmission that was transmitted from a second wireless emitter that is fixedly positioned to a second component during calibration, the second component comprising at least one of, the wagering game machine;

the display; and a projector configured to project a video of the wagering game play on to the display;

capture a first gameplay wireless transmission that was transmitted from the first wireless emitter during the wagering game play; and capture a second gameplay wireless transmission that was transmitted from the second wireless emitter during the wagering game play; and a position module executable on the processor and configured to, receive the first calibration wireless transmission, the second calibration wireless transmission, the first gameplay wireless transmission, and the second gameplay wireless transmission determine a calibration movement difference between the first calibration wireless transmission and the second calibration wireless transmission;

determine a gameplay movement difference between the first gameplay wireless transmission and the second gameplay wireless transmission;

compare the calibration movement difference with the gameplay movement difference; and in response to at least one of the calibration movement difference and the gameplay movement difference being unequal and a difference between the calibration movement difference and the gameplay movement different exceeding a threshold error, output an indicator of at least one of movement of at least one of the first component and the second component;

distortion of the first gameplay transmission; and distortion of the second gameplay transmission.

17. The wagering game machine of claim 16, wherein the first calibration wireless transmission comprises data identifying three axes of position and three axes of rotation of the receiver relative to the wagering game machine emitter;

wherein the second calibration wireless transmission comprises data identifying three axes of position and three axes of rotation of the receiver relative to the display emitter;

wherein the first gameplay wireless transmission comprises data identifying three axes of position and three axes of rotation of the receiver relative to the wagering game machine emitter; and wherein the second gameplay wireless transmission comprises data identifying three axes of position and three axes of rotation of the receiver relative to the display emitter.

18. The wagering game machine of claim 17, wherein, as part of determination of the calibration movement difference, the position module is configured to, determine, for the first calibration wireless transmission, first calibration X position data in a direction along an X axis of the three axes of position;

determine, for the first calibration wireless transmission, first calibration Y position data in a direction along a Y axis of the three axes of position;

determine, for the first calibration wireless transmission, first calibration Z position data in a direction along a Z axis of the three axes of position;

determine, for the first calibration wireless transmission, first X rotation data for the X axis of the three axes of rotation;

determine, for the first calibration wireless transmission, first calibration Y rotation data for the Y axis of the three axes of rotation;

determine, for the first calibration wireless transmission, first calibration Z rotation data for the Z axis of the three axes of rotation;

determine, for the second calibration wireless transmission, second calibration X position data in a direction along an X axis of the three axes of position;

determine, for the second calibration wireless transmission, second calibration Y position data in a direction along a Y axis of the three axes of position;

determine, for the second calibration wireless transmission, second calibration Z position data in a direction along a Z axis of the three axes of position;

determine, for the second calibration wireless transmission, second calibration X rotation data for the X axis of the three axes of rotation;

determine, for the second calibration wireless transmission, second calibration Y rotation data for the Y axis of the three axes of rotation;

determine, for the second calibration wireless transmission, second calibration Z rotation data for the Z axis of the three axes of rotation;

determine an X position calibration difference between the first calibration X position data and the second calibration X position data;

determine a Y position calibration difference between the first calibration Y position data and the second calibration Y position data;

determine a Z position calibration difference between the first calibration Z position data and the second calibration Z position data;

determine an X rotation calibration difference between the first calibration X rotation data and the second calibration X rotation data;

determine a Y rotation calibration difference between the first calibration Y rotation data and the second calibration Y rotation data; and determine a Z rotation calibration difference between the first calibration Z rotation data and the second calibration Z rotation data;

and wherein, as part of determination of the gameplay movement difference, the position module is configured to, determine, for the first gameplay wireless transmission, first gameplay X position data in a direction along an X axis of the three axes of position;

determine, for the first gameplay wireless transmission, first gameplay Y position data in a direction along a Y axis of the three axes of position;

determine, for the first gameplay wireless transmission, first gameplay Z position data in a direction along a Z axis of the three axes of position;

determine, for the first gameplay wireless transmission, first gameplay X rotation data for the X axis of the three axes of rotation;

determine, for the first gameplay wireless transmission, first gameplay Y rotation data for the Y axis of the three axes of rotation;

determine, for the first gameplay wireless transmission, first gameplay Z rotation data for the Z axis of the three axes of rotation;

determine, for the second gameplay wireless transmission, second gameplay X position data in a direction along an X axis of the three axes of position;

determine, for the second gameplay wireless transmission, second gameplay Y position data in a direction along a Y axis of the three axes of position;

determine, for the second gameplay wireless transmission, second gameplay Z position data in a direction along a Z axis of the three axes of position;

determine, for the second gameplay wireless transmission, second gameplay X rotation data for the X axis of the three axes of rotation;

determine, for the second gameplay wireless transmission, second gameplay Y rotation data for the Y axis of the three axes of rotation;

determine, for the second gameplay wireless transmission, second gameplay Z rotation data for the Z axis of the three axes of rotation;

determine an X position gameplay difference between the first gameplay X position data and the second calibration X position data;

determine a Y position gameplay difference between the first gameplay Y position data and the second calibration Y position data;

determine a Z position gameplay difference between the first gameplay Z position data and the second calibration Z position data;

determine an X rotation gameplay difference between the first gameplay X rotation data and the second calibration X rotation data;

determine a Y rotation gameplay difference between the first gameplay Y rotation data and the second calibration Y rotation data; and determine a Z rotation gameplay difference between the first gameplay Z rotation data and the second calibration Z rotation data.

19. The wagering game machine of claim 18, wherein, as part of comparison of the calibration movement difference with the gameplay movement difference, the position module is configured to, compare the X position calibration difference to the X position gameplay difference;

compare the Y position calibration difference to the Y position gameplay difference;

compare the Z position calibration difference to the Z position gameplay difference;

compare the X rotation calibration difference to the X rotation gameplay difference;

compare the Y rotation calibration difference to the Y rotation gameplay difference; and compare the Z rotation calibration difference to the Z rotation gameplay difference.

20. The wagering game machine of claim 19, wherein the calibration movement difference and the gameplay movement difference exceed a threshold error if a difference for at least one of the following exceeds a threshold:

the X position calibration difference and the X position gameplay difference;

the Y position calibration difference and the Y position gameplay difference;

the Z position calibration difference and the Z position gameplay difference;

the X rotation calibration difference and the X rotation gameplay difference;

the Y rotation calibration difference and the Y rotation gameplay difference; and the Z rotation calibration difference and the Z rotation gameplay difference.

21. One or more non-transitory machine-readable storage media including instructions which, when executed by one or more processors, cause the one or more processors to perform operations comprising:

receiving a calibration wireless transmission during calibration of a wagering game system, wherein the calibration wireless transmission is emitted by a wireless emitter in a motion sensing controller and captured by a first wireless receiver that is fixedly positioned to a first component of the wagering game system, wherein the motion sensing controller is associated with a wagering game machine of a wagering game system, the motion sensing controller configured to track wagering game play of a wagering game provided by the wagering game machine based on gesture recognition and pointing relative to a display configured to display the wagering game play, wherein the first component comprises at least one of, the wagering game machine;

the display; and a projector configured to project a video of the wagering game play on to the display;

receiving the calibration wireless transmission during calibration of the wagering game system, emitted by the wireless emitter in a motion sensing controller and captured by a second wireless receiver that is fixedly positioned to a second component of the wagering game system, wherein the second component comprises at least one of, the wagering game machine;

the display; and a projector configured to project a video of the wagering game play on to the display;

receiving a first gameplay wireless transmission during game play of the wagering game system, wherein the first gameplay wireless transmission is emitted by the wireless emitter in the motion sensing controller and captured by the first wireless receiver that is fixedly positioned to the first component of the wagering game system;

receiving a second gameplay wireless transmission during game play of the wagering game system, wherein the second gameplay wireless transmission is emitted by the wireless emitter in the motion sensing controller and captured by the second wireless receiver that is fixedly positioned to the second component of the wagering game system;

determining a calibration movement difference between the calibration wireless transmission received by the first wireless receiver and the calibration wireless transmission received by the second wireless receiver;

determining a gameplay movement difference between the gameplay wireless transmission received by the first wireless receiver and the gameplay wireless transmission received by the second wireless receiver;

comparing the calibration movement difference with the gameplay movement difference; and in response to at least one of the calibration movement difference and the gameplay movement difference being unequal and a difference between the calibration movement difference and the gameplay movement difference exceeding a threshold error, outputting an indicator of at least one of movement of at least one of the first component and the second component; and distortion of the gameplay transmission.

22. The one or more non-transitory machine-readable storage media of claim 21, wherein the first calibration wireless transmission comprises data identifying three axes of position and three axes of rotation of the receiver relative to the wagering game machine emitter;

wherein the second calibration wireless transmission comprises data identifying three axes of position and three axes of rotation of the receiver relative to the display emitter;

wherein the first gameplay wireless transmission comprises data identifying three axes of position and three axes of rotation of the receiver relative to the wagering game machine emitter; and wherein the second gameplay wireless transmission comprises data identifying three axes of position and three axes of rotation of the receiver relative to the display emitter.

23. The one or more non-transitory machine-readable storage media of claim 22, wherein the determining of the calibration movement difference comprises, determining, for the first calibration wireless transmission, first calibration X position data in a direction along an X axis of the three axes of position;

determining, for the first calibration wireless transmission, first calibration Y position data in a direction along a Y axis of the three axes of position;

determining, for the first calibration wireless transmission, first calibration Z position data in a direction along a Z axis of the three axes of position;

determining, for the first calibration wireless transmission, first X rotation data for the X axis of the three axes of rotation;

determining, for the first calibration wireless transmission, first calibration Y rotation data for the Y axis of the three axes of rotation;

determining, for the first calibration wireless transmission, first calibration Z rotation data for the Z axis of the three axes of rotation;

determining, for the second calibration wireless transmission, second calibration X position data in a direction along an X axis of the three axes of position;

determining, for the second calibration wireless transmission, second calibration Y position data in a direction along a Y axis of the three axes of position;

determining, for the second calibration wireless transmission, second calibration Z position data in a direction along a Z axis of the three axes of position;

determining, for the second calibration wireless transmission, second calibration X rotation data for the X axis of the three axes of rotation;

determining, for the second calibration wireless transmission, second calibration Y rotation data for the Y axis of the three axes of rotation;

determining, for the second calibration wireless transmission, second calibration Z rotation data for the Z axis of the three axes of rotation;

determining an X position calibration difference between the first calibration X position data and the second calibration X position data;

determining a Y position calibration difference between the first calibration Y position data and the second calibration Y position data;

determining a Z position calibration difference between the first calibration Z position data and the second calibration Z position data;

determining an X rotation calibration difference between the first calibration X rotation data and the second calibration X rotation data;

determining a Y rotation calibration difference between the first calibration Y rotation data and the second calibration Y rotation data; and determining a Z rotation calibration difference between the first calibration Z rotation data and the second calibration Z rotation data;

wherein the determining of the gameplay movement difference comprises, determining, for the first gameplay wireless transmission, first gameplay X position data in a direction along an X axis of the three axes of position;

determining, for the first gameplay wireless transmission, first gameplay Y position data in a direction along a Y axis of the three axes of position;

determining, for the first gameplay wireless transmission, first gameplay Z position data in a direction along a Z axis of the three axes of position;

determining, for the first gameplay wireless transmission, first gameplay X rotation data for the X axis of the three axes of rotation;

determining, for the first gameplay wireless transmission, first gameplay Y rotation data for the Y axis of the three axes of rotation;

determining, for the first gameplay wireless transmission, first gameplay Z rotation data for the Z axis of the three axes of rotation;

determining, for the second gameplay wireless transmission, second gameplay X position data in a direction along an X axis of the three axes of position;

determining, for the second gameplay wireless transmission, second gameplay Y position data in a direction along a Y axis of the three axes of position;

determining, for the second gameplay wireless transmission, second gameplay Z position data in a direction along a Z axis of the three axes of position;

determining, for the second gameplay wireless transmission, second gameplay X rotation data for the X axis of the three axes of rotation;

determining, for the second gameplay wireless transmission, second gameplay Y rotation data for the Y axis of the three axes of rotation;

determining, for the second gameplay wireless transmission, second gameplay Z rotation data for the Z axis of the three axes of rotation;

determining an X position gameplay difference between the first gameplay X position data and the second calibration X position data;

determining a Y position gameplay difference between the first gameplay Y position data and the second calibration Y position data;

determining a Z position gameplay difference between the first gameplay Z position data and the second calibration Z position data;

determining an X rotation gameplay difference between the first gameplay X rotation data and the second calibration X rotation data;

determining a Y rotation gameplay difference between the first gameplay Y rotation data and the second calibration Y rotation data; and determine a Z rotation gameplay difference between the first gameplay Z rotation data and the second calibration Z rotation data;

wherein the comparing of the calibration movement difference with the gameplay movement difference comprises, comparing the X position calibration difference to the X position gameplay difference;

comparing the Y position calibration difference to the Y position gameplay difference;

comparing the Z position calibration difference to the Z position gameplay difference;

comparing the X rotation calibration difference to the X rotation gameplay difference;

comparing the Y rotation calibration difference to the Y rotation gameplay difference; and comparing the Z rotation calibration difference to the Z rotation gameplay difference.

24. The one or more non-transitory machine-readable storage media of claim 23, wherein the calibration movement difference and the gameplay movement difference are unequal if at least one of the following is unequal:

the X position calibration difference and the X position gameplay difference;

the Y position calibration difference and the Y position gameplay difference;

the Z position calibration difference and the Z position gameplay difference;

the X rotation calibration difference and the X rotation gameplay difference;

the Y rotation calibration difference and the Y rotation gameplay difference; and the Z rotation calibration difference and the Z rotation gameplay difference.

25. The one or more non-transitory machine-readable storage media of claim 21, wherein the operations comprise determining a cursor movement for the wagering game play derived by movement of the motion sensing controller and based on at least one of the first gameplay wireless transmission and the second gameplay wireless transmission.

* * * * *